US011971291B2

(12) United States Patent
Cornwall et al.

(10) Patent No.: US 11,971,291 B2
(45) Date of Patent: Apr. 30, 2024

(54) GAS REGULATOR PRESSURE-RELIEF MONITOR

(71) Applicant: Itron, Inc., Liberty Lake, WA (US)

(72) Inventors: Mark K. Cornwall, Spokane, WA (US); James Lee Kann, Mica, WA (US); Peter Clevenger, Liberty Lake, WA (US)

(73) Assignee: ITRON, INC., Liberty Lake, WA (US)

(*) Notice: Subject to any disclaimer, the term of this patent is extended or adjusted under 35 U.S.C. 154(b) by 607 days.

(21) Appl. No.: 17/127,880

(22) Filed: Dec. 18, 2020

(65) Prior Publication Data

US 2022/0196454 A1 Jun. 23, 2022

(51) Int. Cl.
*G01F 25/10* (2022.01)
*F17D 1/04* (2006.01)
(Continued)

(52) U.S. Cl.
CPC ............... *G01F 25/15* (2022.01); *F17D 1/04* (2013.01); *F17D 3/01* (2013.01); *F17D 5/02* (2013.01); *H04Q 9/00* (2013.01); *H04Q 2209/00* (2013.01)

(58) Field of Classification Search
CPC ........... H04Q 2209/00; H04Q 2209/10; H04Q 2209/40; H04Q 2209/43; H04Q 2209/60;
(Continued)

(56) References Cited

U.S. PATENT DOCUMENTS 2,302,284 A 11/1942 Abbott
5,878,779 A 3/1999 Bircann et al.
(Continued)

FOREIGN PATENT DOCUMENTS

CN 104314527 10/2017
EP 1062645 11/2002
(Continued)

OTHER PUBLICATIONS

Office Action for U.S. Appl. No. 17/939,856, dated Jan. 25, 2023, Kann, "Network Edge Detection and Notification of Gas Pressure Situation", 23 pages.
(Continued)

*Primary Examiner* — Franklin D Balseca
(74) *Attorney, Agent, or Firm* — Lee & Hayes P.C.

(57) ABSTRACT

Techniques for using data indicating if a gas regulator supplying gas at a regulated pressure to a gas meter (e.g., the gas meter of a house or business) within a gas distribution system has one or more lock-up failure events or venting events, wherein gas is vented to the atmosphere. The data may identify the identity of gas regulators at which the lock-up failure events or venting events occurred. Based at least in part on the identified gas regulators, a number of gas regulators having at least one of lock-up failure events or venting events that are connected to a same gas supply line may be identified. If the number of gas regulators having at least one of lock-up failure events or venting events on the identified gas supply line exceeds a threshold number this may indicate the presence of debris in the gas supply. Remedial steps may be taken, and the situation may be monitored and reassessed.

20 Claims, 11 Drawing Sheets

(51) Int. Cl.
F17D 3/01 (2006.01)
F17D 5/02 (2006.01)
H04Q 9/00 (2006.01)

(58) Field of Classification Search
CPC .......... H04Q 2209/70; H04Q 2209/80; H04Q 2209/82; H04Q 2209/823; H04Q 2209/826; H04Q 9/00; F17D 5/00; F17D 5/005; F17D 5/02; F17D 1/04; F17D 3/01; G01F 25/15
See application file for complete search history.

(56) References Cited

U.S. PATENT DOCUMENTS

| | | |
|---|---|---|
| 7,458,387 B2 | 12/2008 | McGill |
| 7,759,948 B2 | 7/2010 | Tischendorf et al. |
| 7,980,136 B2 | 7/2011 | Ben-Mansour |
| 8,054,199 B2 | 11/2011 | Addy |
| 8,485,213 B2 | 7/2013 | Hawkins et al. |
| 9,182,052 B2* | 11/2015 | Scott .................. F16K 37/0083 |
| 9,928,720 B2 | 3/2018 | Cornwall |
| 9,939,341 B2 | 4/2018 | McNab et al. |
| 10,704,946 B2 | 7/2020 | Seehoffer |
| 10,948,131 B1 | 3/2021 | Francis |
| 11,047,496 B1 | 6/2021 | McConnell |
| 11,473,933 B2* | 10/2022 | Heizenroeder ........ G01D 4/002 |
| 2004/0187930 A1 | 9/2004 | Hawkins et al. |
| 2006/0248032 A1 | 11/2006 | Jellum et al. |
| 2008/0270045 A1 | 10/2008 | Miyata et al. |
| 2009/0018782 A1 | 1/2009 | Sameda et al. |
| 2009/0198384 A1 | 8/2009 | Ahn |
| 2009/0240445 A1 | 9/2009 | Umekage et al. |
| 2010/0017150 A1 | 1/2010 | Itou |
| 2010/0156632 A1 | 6/2010 | Hyland et al. |
| 2010/0188261 A1 | 7/2010 | Fujii |
| 2010/0219933 A1 | 9/2010 | Ueki et al. |
| 2010/0229653 A1 | 9/2010 | Tabellario |
| 2010/0269596 A1 | 10/2010 | Miyata et al. |
| 2011/0254696 A1 | 10/2011 | Cornwall et al. |
| 2011/0288793 A1 | 11/2011 | Sanchez-Loureda et al. |
| 2011/0313964 A1 | 12/2011 | Sanchey Loureda et al. |
| 2012/0022812 A1 | 1/2012 | Longtin |
| 2012/0111799 A1 | 5/2012 | Lemoine et al. |
| 2012/0112901 A1 | 5/2012 | Chasko |
| 2012/0136593 A1 | 5/2012 | Donaldson et al. |
| 2012/0173252 A1 | 7/2012 | Mak et al. |
| 2012/0174655 A1 | 7/2012 | Essich |
| 2013/0035884 A1 | 2/2013 | Burke et al. |
| 2013/0096857 A1 | 4/2013 | Chakradhar |
| 2013/0110621 A1 | 5/2013 | Gupta et al. |
| 2013/0204399 A1 | 8/2013 | Donaldson et al. |
| 2013/0262197 A1 | 10/2013 | Kaulgud et al. |
| 2014/0130878 A1 | 5/2014 | Marinez |
| 2014/0207392 A1 | 7/2014 | Cornwall |
| 2014/0231531 A1 | 8/2014 | van der Donk et al. |
| 2016/0001114 A1 | 1/2016 | Hyland et al. |
| 2016/0327603 A1 | 11/2016 | Sonderegger et al. |
| 2016/0334029 A1 | 11/2016 | French |
| 2017/0193790 A1 | 7/2017 | Cornwall |
| 2018/0052023 A1 | 2/2018 | Yokohata et al. |
| 2019/0025150 A1 | 1/2019 | Picardi et al. |
| 2019/0234786 A1 | 8/2019 | Klicpera |
| 2019/0242741 A1 | 8/2019 | Idris et al. |
| 2019/0289077 A1 | 9/2019 | Sacchetti |
| 2019/0323918 A1 | 10/2019 | Sahoo |
| 2020/0003606 A1 | 1/2020 | Yu |
| 2020/0124195 A1 | 4/2020 | Monk |
| 2020/0132219 A1 | 4/2020 | Thompson et al. |
| 2020/0173810 A1 | 6/2020 | Verma et al. |
| 2020/0386732 A1 | 12/2020 | Park et al. |
| 2021/0190568 A1 | 6/2021 | Haag et al. |
| 2021/0392604 A1 | 12/2021 | Deshmukh |
| 2022/0128428 A1 | 4/2022 | Clark |
| 2022/0170773 A1* | 6/2022 | Lampe-Juergens ..... G01F 25/10 |
| 2022/0196183 A1 | 6/2022 | Kann et al. |
| 2022/0196448 A1 | 6/2022 | Cornwall et al. |
| 2022/0196451 A1 | 6/2022 | Cornwall et al. |
| 2022/0198904 A1 | 6/2022 | Kann et al. |
| 2022/0201082 A1 | 6/2022 | Cornwall et al. |
| 2022/0412787 A1 | 12/2022 | Kann |
| 2023/0005353 A1 | 1/2023 | Kann |
| 2023/0224367 A1 | 2/2023 | Cornwall |
| 2023/0273053 A1 | 8/2023 | Cornwall et al. |

FOREIGN PATENT DOCUMENTS

| | | |
|---|---|---|
| EP | 2477088 | 7/2012 |
| WO | WO2009075082 | 6/2009 |
| WO | WO2010111699 | 9/2010 |
| WO | WO2011068273 | 8/2012 |
| WO | WO2012106709 | 8/2012 |
| WO | WO2012156758 | 11/2012 |
| WO | WO2016170870 A1 | 10/2016 |
| WO | WO2017061994 A1 | 4/2017 |
| WO | WO2018209238 | 11/2018 |

OTHER PUBLICATIONS

Office action for U.S. Appl. No. 17/127,713, dated Nov. 25, 2022, Cornwall et al., "Disaggregation of Gas Load to Determine Meter or Service Under-Sizing", 26 pages.

Anwar, F., et al., Network-Based Real-time Integrated Fire Detection and Alarm (FDA) System with Building Automation, 6th Intl. Conf. on Mechatronics, ICOM'17, IOP Conf. Series: Materials Science & Engineering, vol. 260, No. 012025, Aug. 8-9, 2017, Kuala Lumpur, Malaysia, at <http://iopscience.iop.org/article/10.1088/1757-899X/260/1/012025/meta>, 16 pages.

Artim , N., Emergency Management, 3.2 an Introduction to Fire Detection, Alarm, & Automatic Fire Sprinklers, Northeast Document Conservation Center, Nov. 28, 2018, at <https://www.nedcc.org/free-resources/preservation-leaflets/3.-emergency-management/3.2-an-introduction-to-fire-detection,-alarm,-and-automatic-fire-sprinklers>, 26 pages.

"Automated Flushing Gives Water Savings," Elsevier Ltd., Nov. 6, 2019, at <https://www.filtsep.com/water-and-wastewater/features/automated-flushing-gives-water-savings/>, 3 pages.

"Backflow Prevention—What does it Mean to You?", American Backflow Prevention Association, found at <https://www.abpa.org/page/BackflowPrevention#>, date unknown, printed on Jan. 8, 2021, 2 pages.

Dreher, A., et al., "*E. coli* Found in Some Contaminated Hillyard Water This Weekend," The Spokesman-Review, Spokane, Washington, Jul. 31, 2019, at <https://www.spokesman.com/stories/2019/jul/31/e-coli-found-in-some-contaminated-hillyard-water-t/>, 6 pages.

Energy Systems, Electricity, and Fire Safety, Course AP 312, University School of Planning and Architecture, Guru Gobind Singh Indraprastha University, Delhi, IN, published Jun. 13, 2015, found at <https://www.slideshare.net/supergirlanchal/energy-systems-electricity-and-fire-safety>, 41 pages.

Fontanazza, C., et al., "Contaminant intrusion through leaks in water distribution system: experimental analysis," Procedia Engineering , vol. 19 (2015), 13th Computer Control for Water Industry Conference, CCWI 2015, Sep. 2-4, 2015, Leicester, UK, pp. 426-433.

Hopf, Dr. S., "Application Models for the Power Distribution: High-rise Buildings", copyright 2012, Siemens Aktiengesellschaft, Berlin and Munich, Germany, found at <https://www.siemens.com/content/dam/webassetpool/mam/tag-siemens-com/smdb/energy-management/services-power-transmission-power-distribution-smart-grid/consulting/tip-planungshandb%C3%BCcher/application-model-for-high-rise-buildings.pdf>, printed from Internet on Nov. 28, 2018, 96 pages.

"How Much Does an Industrial Water Treatment System Cost?", found at <https://www.samcotech.com/how-much-does-an-industrial-water-treatment-system-cost/>, SAMCO, dated Sep. 22, 2017, 4 pages.

(56) References Cited

OTHER PUBLICATIONS

Kapis, J., et al., Integration: Building Automation and Fire Alarms Insights, Schneider Electric US, date unknown, found online at <https://www.schneider-electric.us/en/work/insights/integration-building-automation-and-fire-alarms.jsp>, obtained from Internet on Nov. 28, 2018, 9 pages.
Manual of Design and Specification Standards, Div 16 Electrical, Section 16720 Fire Alarm Systems, University of Arizona, Mar. 2004, found at <https://pdc.arizona.edu/dssarchive/rev4/16720.pdf>, obtained from the Internet on Nov. 28, 2018, 3 pages.
Mar, et al., Integrating BAS, Electrical Systems Insights, Schneider Electric UK, date unknown, found online at <https://www.schneider-electric.co.uk/en/work/insights/integrating-bas-electrical-systems.jsp>, obtained from Internet on Nov. 28, 2018, 9 pages.
Non-Final Office Action dated Jan. 29, 2020, for U.S. Appl. No. 16/206,121, 12 pages.
Office Action for U.S. Appl. No. 17/127,678, dated May 24, 2022, Cornwall, "Disaggregation of Gas Load to Determine Gas Appliance Performance", 21 Pages.
Office Action for U.S. Appl. No. 17/127,678, dated Jul. 20, 2022, Cornwall, "Disaggregation of Gas Load to Determine Gas Appliance Performance", 21 pages.
The International Preliminary Report on Patentability for PCT Application No. PCT/US21/53001, dated Feb. 8, 2022.
The International Preliminary Report on Patentability for PCT Application No. PCT/US21/53007, dated Feb. 3, 2022.
PCT International Search Report and Written Opinion dated Feb. 19, 2020, for PCT Application No. PCT/US2019/063002, 14 pages.
"Potential Contamination Due to Cross-Connections and Backflow and the Associated Health Risks," U.S. Environmental Protection Agency Office of Ground Water and Drinking Water Standards and Risk Management Division, Washington DC, Sep. 27, 2001, 44 pages.
"Remotely Control and Automatically Optimise Pressure in Your Entire Network," oNet, i20 Solutions, dated Feb. 20, 2018, 2 pages.
White, R., "Liberty Lake Water Contamination Will Likely Require a Week of Boiling Drinking Water," The Spokesman-Review, Spokane, Washington, Nov. 22, 2019, at <https://www.spokesman.com/stories/2019/nov/21/liberty-lake-water-contamination-will-likely-requi/>, 3 pages.
Office Action for U.S. Appl. No. 17/127,896, dated Oct. 7, 2021, Kann, "Network Edge Detection and Notification of Gas Pressure Situation", 21 Pages.
Office Action for U.S. Appl. No. 17/127,841, dated Sep. 19, 2022, Kann, "Gas Regulator Diaphragm-Position and Pressure-Relief Detection", 12 pages.
Office Action for U.S. Appl. No. 16/454,625, dated Feb. 23, 2021, Sahoo, "Measuring Contamination to Determine Leak Location", 10 Pages.
Office action for U.S. Appl. No. 13/747,295, dated Jan. 19, 2017, Cornwall, "System to Identify Gas Usage by Appliance", 24 pages.
Office action for U.S. Appl. No. 13/747,295, dated Nov. 18, 2015, Cornwall, "System to Identify Gas Usage by Appliance", 14 pages.
Office action for U.S. Appl. No. 13/747,295, dated Mar. 4, 2016, Cornwall, "System to Identify Gas Usage by Appliance", 12 pages.
PCT Search Report and Written Opinion dated Apr. 8, 2014 for PCT Application No. PCT/US13/68213, 9 Pages.
The PCT Search Report dated Mar. 28, 2018 for PCT application No. PCT/US2017/067827, 19 pages.
Segura, "Use of hydroinformatics technologies for real time water quality management and operation of distribution networks. Case sutdy of Villavicencio, Colombia", Mar. 1, 2006, Delft, Netherlands, retrieved from the internet at URL:https://www.un-ihe.org/sites/default/files/leonardo_alfonso_msc.pdf on Mar. 20, 2018.
Henderson, et al., "Disaggregating Hot Water Use and Predicting Hot Water Waste in Five Test Homes", U.S Department of Energy, 2014.
Office Action for U.S. Appl. No. 17/127,841, dated Sep. 14, 2023, Kann, "Gas Regulator Diaphragm-Position and Pressure-Relief Detection" 14 pages.
Office Action for U.S. Appl. No. 18/195,202, dated Dec. 26, 2023, Mark K. Cornwall, "Disaggregation of Gas Load to Determine Meter or Service Under-Sizing", 7 pages.
Office Action for U.S. Appl. No. 17/939,856, dated Jun. 12, 2023, James Lee Kann, "Network Edge Detection and Notification of Gas Pressure Situation", 24 pages.
Office Action for U.S. Appl. No. 18/114,780, dated Aug. 8, 2023, Mark K. Cornwall, "Disaggregation of Gas Load to Determine Gas Appliance Performance", 20 pages.

* cited by examiner

700 Continued

714
DETERMINE ASPECTS OF THE OPERATION OF THE GAS PRESSURE REGULATOR

716
DETERMINE, BASED AT LEAST IN PART ON THE SIGNAL, IF A RELIEF VALVE OF THE GAS REGULATOR VENTED GAS, WHEREIN THE DETERMINING IS PERFORMED BY A PROCESSOR OF AT LEAST ONE OF:
THE GAS REGULATOR;
A GAS METER RECEIVING GAS FROM THE GAS REGULATOR; OR
A COMPUTING DEVICE AT A LOCATION REMOTE FROM THE GAS REGULATOR AND GAS METER

718
DETERMINE, BASED AT LEAST IN PART ON THE SIGNAL, IF A RELIEF VALVE OF THE GAS REGULATOR VENTED GAS, WHEREIN THE INFORMATION COMPRISES AT LEAST ONE OF:
A DISTANCE BETWEEN A STOP STEM OF THE GAS REGULATOR AND A DIAPHRAGM PIN OF THE GAS REGULATOR;
AN INDICATOR OF CONTACT BETWEEN THE STOP STEM OF THE GAS REGULATOR AND THE DIAPHRAGM PIN OF THE GAS REGULATOR; OR
AN INDICATOR OF FORCE BETWEEN THE STOP STEM OF THE GAS REGULATOR AND THE DIAPHRAGM PIN OF THE GAS REGULATOR

720
DETERMINE A TIME AT WHICH A RELIEF VALVE OF THE REGULATOR VENTED GAS; AND/OR
DETERMINE AN ELAPSED TIME DURING WHICH GAS WAS VENTED BY THE GAS REGULATOR.

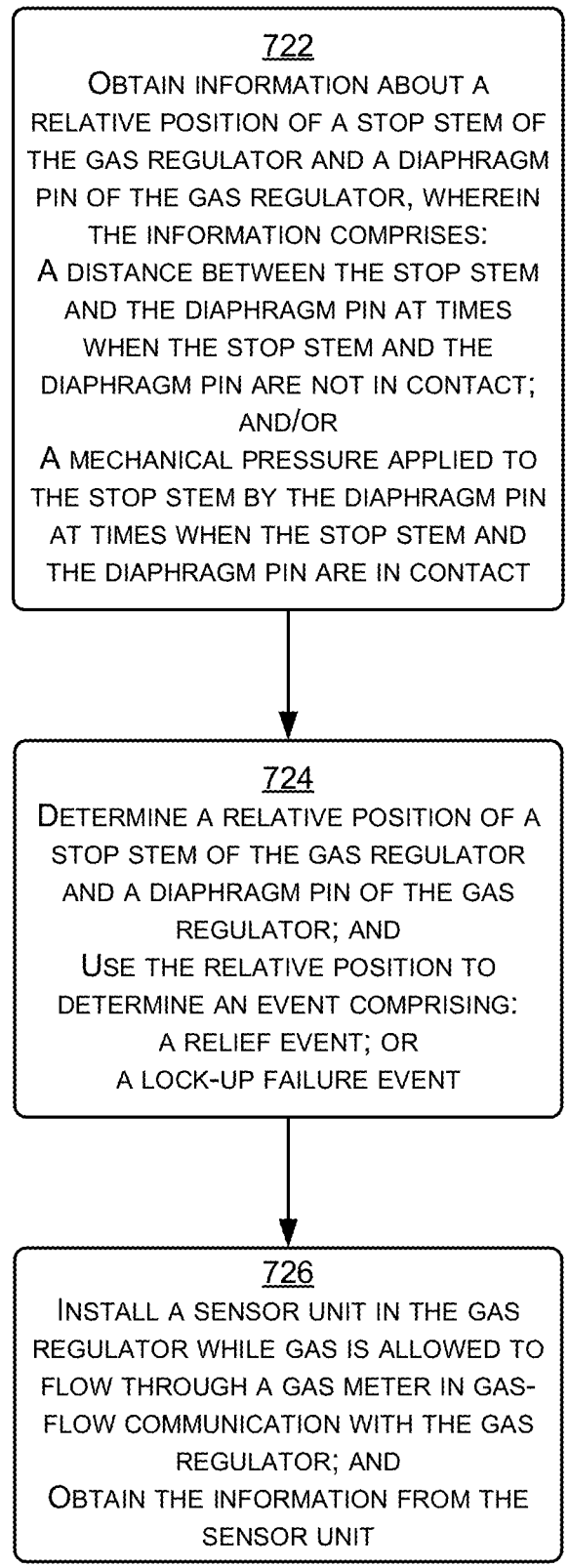

722
OBTAIN INFORMATION ABOUT A RELATIVE POSITION OF A STOP STEM OF THE GAS REGULATOR AND A DIAPHRAGM PIN OF THE GAS REGULATOR, WHEREIN THE INFORMATION COMPRISES:
A DISTANCE BETWEEN THE STOP STEM AND THE DIAPHRAGM PIN AT TIMES WHEN THE STOP STEM AND THE DIAPHRAGM PIN ARE NOT IN CONTACT; AND/OR
A MECHANICAL PRESSURE APPLIED TO THE STOP STEM BY THE DIAPHRAGM PIN AT TIMES WHEN THE STOP STEM AND THE DIAPHRAGM PIN ARE IN CONTACT

724
DETERMINE A RELATIVE POSITION OF A STOP STEM OF THE GAS REGULATOR AND A DIAPHRAGM PIN OF THE GAS REGULATOR; AND
USE THE RELATIVE POSITION TO DETERMINE AN EVENT COMPRISING:
A RELIEF EVENT; OR
A LOCK-UP FAILURE EVENT

726
INSTALL A SENSOR UNIT IN THE GAS REGULATOR WHILE GAS IS ALLOWED TO FLOW THROUGH A GAS METER IN GAS-FLOW COMMUNICATION WITH THE GAS REGULATOR; AND
OBTAIN THE INFORMATION FROM THE SENSOR UNIT

FIG. 7C

GAS REGULATOR PRESSURE-RELIEF MONITOR

BACKGROUND

A gas regulator is a device that may be used on an incoming pipe supplying gas (e.g., natural gas) to regulate gas pressure before the gas enters a gas meter. In example construction of a regulator, the incoming gas pushes against a movable diaphragm. If the pressure on the diaphragm is great enough, movement of the diaphragm closes a valve, thereby shutting off gas flow to the meter. However, if debris is caught in the valve then gas continues to leak or flow, and the gas pressure may increase. To prevent an over-pressure event (e.g., a valve lockup-failure), most existing gas regulators include a relief valve as a second line of defense. When gas pressure overcomes the force of a spring holding the relief valve closed, the relief valve opens to vent gas into the atmosphere. The relief valve thereby prevents over-pressure damage to appliances, gas lines, etc.

While the relief valve performs an important safety function, venting natural gas is undesirable because natural gas is a greenhouse gas, a form of air pollution, a fire and/or explosive hazard, and a valuable commodity. Accordingly, there is a need to understand the locations, times and relationships of such gas venting events. Moreover, there is a need to lessen the number of venting instances, and to thereby prevent the adverse effects of natural gas venting.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 7A, 7B, 7C are respective parts a flow diagram showing example operation of a sensor within a gas pressure regulator.

DETAILED DESCRIPTION

Overview

Figure 1:
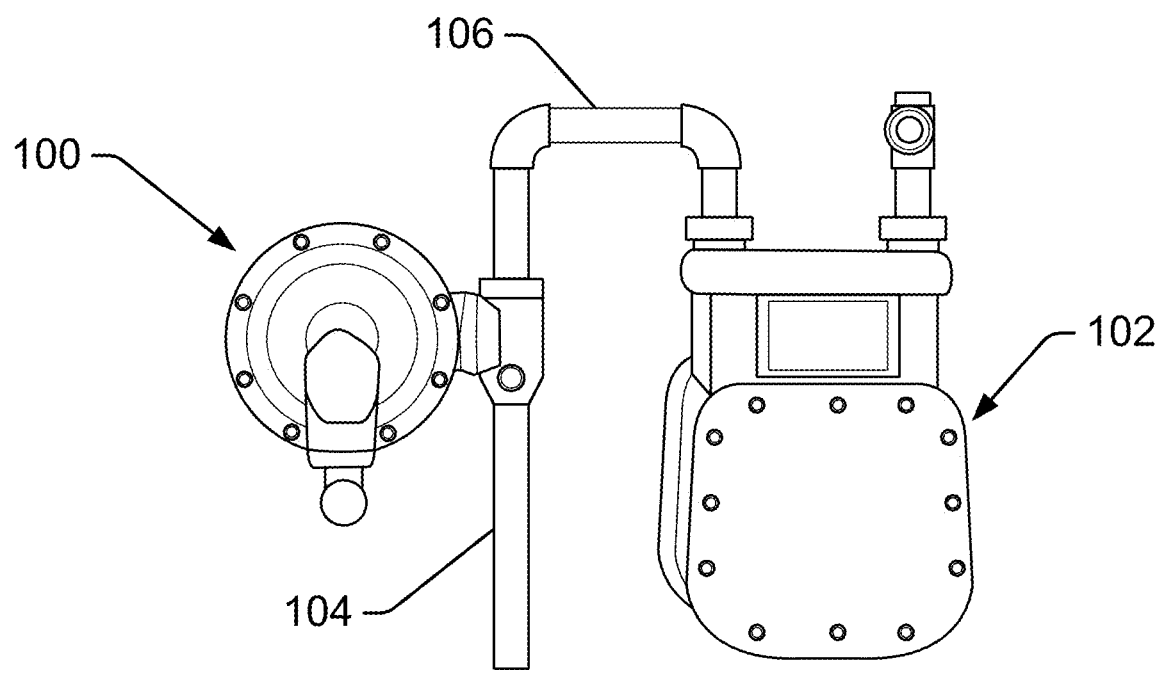
FIG. 1 is a view of a gas pressure regulator and a gas meter, configured at a customer site.

A gas pressure regulator provides gas at a regulated pressure to an associated gas meter, both of which are typically seen on an outside wall of a home or building. The disclosure describes devices and operational techniques by which the gas pressure regulator may provide an indication (e.g., signal or message) of an over-pressure event, a valve-closing failure, a valve lock-up failure, a venting event, and/or a near-venting event of gas into the atmosphere. If gas pressure within a regulator is sufficiently high, a valve-closing (i.e., a regulator lock-up) should result, wherein the main valve of the gas regulator closes. A successful valve-closing prevents gas from passing through the gas regulator and into a gas meter and/or the customer's appliances. The main valve remains closed as long as the gas pressure against a diaphragm of the gas regulator is great enough to hold the main valve in the closed position.

If debris is caught in the main regulator valve, then the valve-closing (i.e., the regulator valve lock-up) could fail. In such an event, gas continues to flow (perhaps slowly) into and through the regulator. As pressure builds, the spring that holds the venting valve in the closed position may be overcome, allowing the venting valve to open and vent gas.

The techniques describe the use of sensor(s), communication devices, etc., to monitor and report movement of the diaphragm, the venting valve, and/or other regulator components. Signals, messages, etc., provide information about the operation of the regulator, pressure, venting, etc.

In a single example for purposes of illustration only, a sensor obtains information indicating a relative position of a stop stem of a gas regulator and a diaphragm pin of the gas regulator. Gas pressure within the regulator may increase, such as from debris in the regulator that prevents the main valve from fully closing. As pressure increases within the regulator and pushes on the diaphragm, the diaphragm pin moves toward and/or touches the stop stem. A signal may be sent from the sensor of the regulator, and may be relayed by an associated gas meter. The signal may contain information based at least in part on data from the sensor, and which may indicate a lock-up failure event and/or a venting event by the gas regulator.

Techniques discussed herein also provide for the collection and use of data indicating if a gas regulator within a gas distribution system has one or more over-pressure events, valve-closing failure events, lock-up failure events, and/or venting events, wherein gas is vented to the atmosphere. The data may identify the identity of gas regulators at which the lock-up failure events or gas-venting events occurred. Based at least in part on the identified gas regulators, a number of gas regulators having at least one of lock-up failure (valve closure failure) events or venting events that are connected to a same gas supply line may be identified. If the number of gas regulators having at least one of lock-up failure events or venting events on the identified gas supply line exceeds a threshold number this may indicate the presence of debris in the gas supply. Remedial steps may be taken, and the situation may be monitored and reassessed.

Example Gas Regulator Sensor

FIG. 1 is a view of a gas pressure regulator 100, a gas meter 102 and an incoming gas line 104, configured at a customer site. The gas pressure regulator 100 limits the pressure of the gas that is sent to the gas meter 102 through pipe 106. The gas pressure regulator 100 is configured to include sensor(s) and to operate according to techniques that provide an indication (e.g., signal or message) of an over-pressure event, a valve-closing failure, a lock-up failure, a venting event, and/or a near-venting event of gas into the atmosphere, as described herein.

Figure 2:
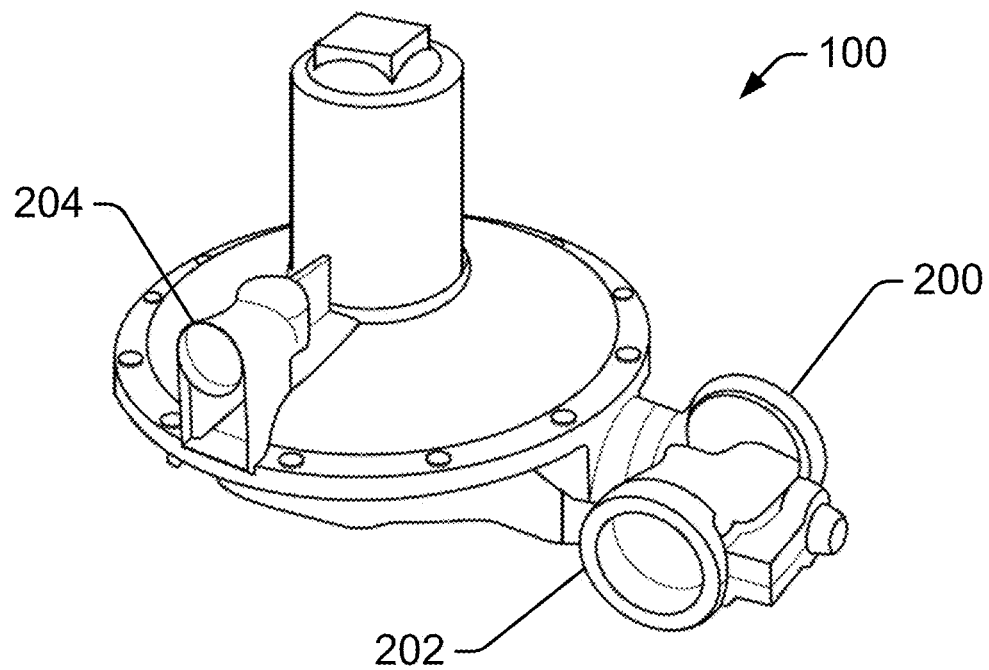
FIG. 2 is a view of the gas pressure regulator, showing input and output ports, and an over-pressure relief vent.

FIG. 2 is a view of the gas pressure regulator 100, showing an input port 200, an output port 202, and an over-pressure gas relief port or vent 204.

Example Sensor Units and Regulator Operation

Figure 3:
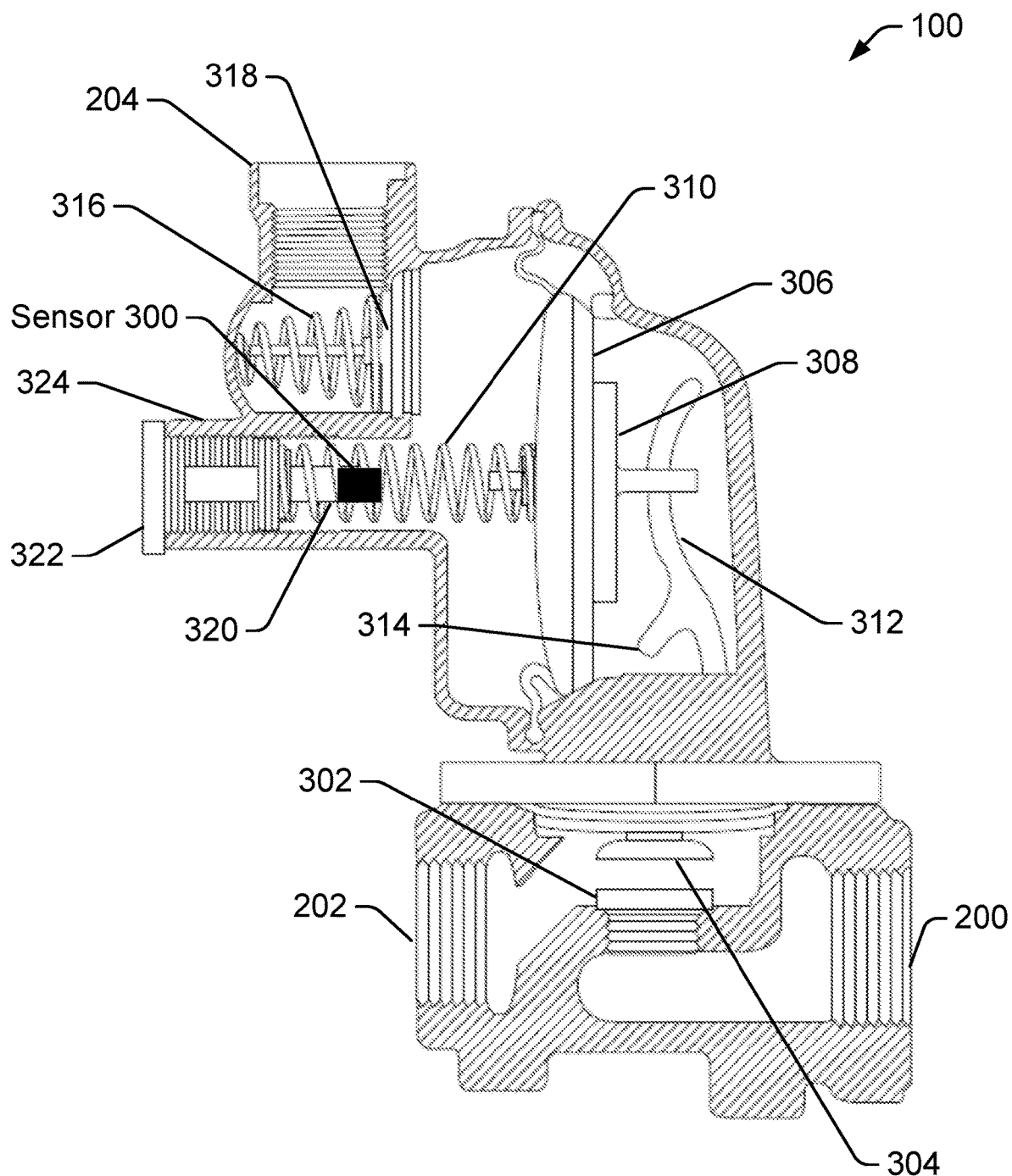
FIG. 3 shows a cross-sectional view of an example gas pressure regulator including the diaphragm, and a first example sensor component, an input port, a gas shutoff valve, a gas venting port, and an output port.
Figure 4:
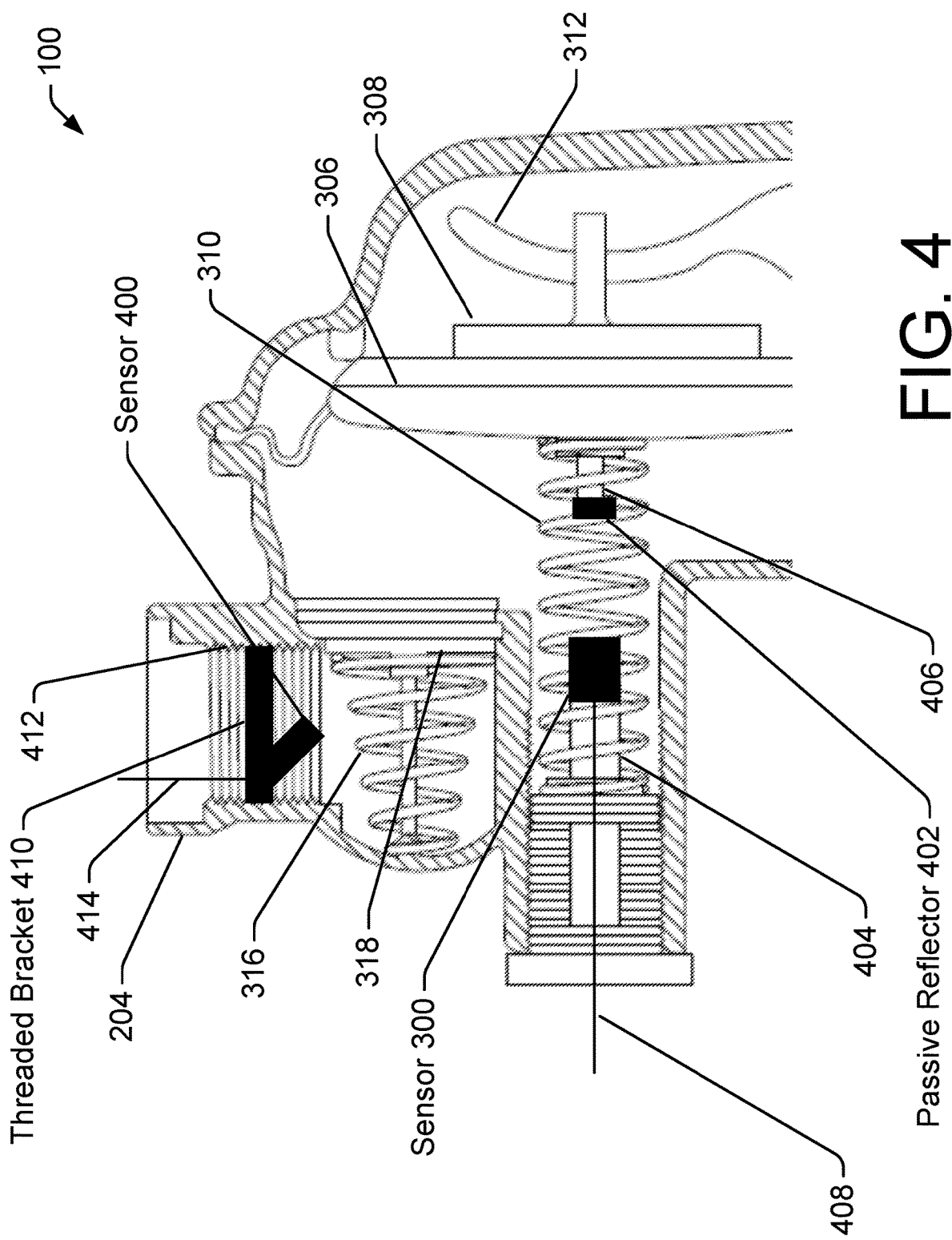
FIG. 4 shows an enlarged cross-sectional view of an example gas pressure regulator including optional or example detail of the first example sensor component and a second example sensor component.

FIGS. 3 and 4 show cross-sectional views of portions of the gas pressure regulator, including two example sensor units. In some example implementations of the gas regulator, one of the two example sensor units may be used. In other example implementations of the gas regulator, both sensor units may be used. In still further example implementations of the gas regulator, alternative sensor units and sensor technologies, known to those trained in the art, may be substituted for the sensor units shown while still in keeping with the teachings and descriptions of the disclosed gas regulator.

FIG. 3 shows a cross-sectional view of the gas pressure regulator 100 having a sensor 300. In an example, the sensor 300 and/or other devices provide an indication (e.g., signal or message) of an over-pressure event, a valve-closing failure, a lock-up failure a near gas-venting event, and/or a gas-venting event, wherein gas is vented into the atmosphere. In the example of FIG. 3, the sensor 300 is mounted on the stop stem 320. The stop stem 320 may be connected to a threaded cap 322. In installation, a stop stem without a sensor may be removed, and a stop stem with a sensor may be attached by advancing the threaded cap into a threaded port 324 of the regulator. The sensor 300 is configured to measure the distance between the diaphragm pin and the stop stem (better seen in FIG. 4). If the diaphragm pin contacts the stop stem, the force exerted by one or both may be measured by the sensor 300. The signal sent by the sensor 300, and information contained therein, may be based at least in part on the distance and/or the force.

In typical operation, gas enters the regulator at the input port 200 and flows through a hollow bolt 302. Gas flows past the open valve 304 and exits the output port 202. Gas on the output port side of the valve 304 has access to the right side of the diaphragm 306 and/or the diaphragm plate 308 (right side, in the orientation of FIG. 3). Accordingly, if an appliance uses gas, the gas pressure on the downstream side of valve 304 is lowered. The allows the spring 310 to extend due to the lessened gas pressure. This moves the arm 312 and associated valve mover 314. In some configurations, the valve mover 314 may be a portion of the arm 312. Movement of the valve mover 314, away from the valve 304 allows the valve to move away (e.g., under power of a spring, not shown) from the hollow bolt 302, to thereby allow more gas to flow.

However, if an appliance stops using gas, or uses less gas, this causes gas pressure to build up at the output port 202. Accordingly, gas pressure on the right side (in the orientation of FIG. 3) of the diaphragm 306 and/or diaphragm plate 308 is reduced. This causes the arm 312 to move, and the valve mover 314 to close the valve 304 against the hollow bolt 302, thereby fully or partially close the valve 304. With the valve 304 closed, additional pressure does not build up on the right side of the diaphragm.

In some instances, a piece of debris becomes caught between a perimeter or flange of the hollow bolt 302 and the valve 304. In such instances, the valve 304 fails to seat properly (e.g., in a leak-free manner) on the hollow bolt 302. In this circumstance, gas may continue to trickle through the partially closed main valve 304. In consequence, an over-pressure—which could also be described as a valve-closing failure and/or a valve lock-up failure—may result.

Referring to FIG. 3 to illustrate an example of the valve-closing failure, while demand for gas is reduced or non-existent, debris prevents the valve from closing tightly, and at least some gas continues to flow. The gas flow passes through the valve and into the area to the right of the diaphragm. Since an appliance is not using gas, pressure builds up on the diaphragm. The diaphragm 306 and plate will move to the left (in the orientation of FIG. 3) until the pin attached to the plate 308 contacts the stop stem 320. At that point, the gas pressure continues pushing on the diaphragm, but the plate can't move, due to the contact. Accordingly, the plate separates from the diaphragm and gas moves through a hole in the center of the diaphragm (not shown) that the plate was covering. Thus, gas moves from the right side of the diaphragm to the left side of the diaphragm. Once on the left side of the diaphragm, gas pushes on relief valve 318 and exits through port 204. The spring 316 typically provides only very light resistance, so once the gas makes it to the left side of the diaphragm it is able to pass through the relief valve 318 and through port 204. This venting of gas may continue intermittently until the main valve 304 is able to properly seat against the hollow bolt 302 and/or the customer begins to use gas, thereby lowering the gas pressure. In some instances, the movement of gas will dislodge the debris.

In such venting and/or near venting conditions, the sensor 300 (and/or the sensor 400 of FIG. 4) may send a signal that is based at least in part on the distance between and/or the force of the diaphragm pin acting on the stop stem.

Example Monolithic and Compound Sensors

FIG. 4 shows an enlarged cross-sectional view of a portion of the gas pressure regulator 100, including the example diaphragm-movement sensor 300 and a second example relief valve-movement sensor 400. In some examples, the sensors 300 and/or 400 are monolithic, in that the sensor senses distance and/or movement (or pressure or force resulting from movement) of a regulator component without the aid of a supporting unit.

In other examples, the sensor unit is compound, with an active sensing unit and a supporting or passive unit or device. In examples, the sensor unit may send a signal and/or detect a responsive signal that is reflected, caused, etc., by a supporting or passive unit. The base unit may measure optical, magnetic, acoustic, capacitive, radio frequency, etc., conditions, while the supporting unit may be optically or acoustically reflective, magnetic, etc. The active sensor unit 300 (e.g., an optical sensor or a capacitive sensor) may be mounted on a first component (e.g., the stop stem). The passive, supporting and/or corresponding device 402 (e.g., an optical reflector or a capacitive component) mounted on a second component (e.g., a diaphragm pin). In some examples, the locations of the active and passive sensor components may be reversed.

Example Sensor to Detect Diaphragm Movement

In one example illustrated by FIG. 4, a sensor 300 mounted on, or is part of, the stop stem 404 of the regulator.

The sensor 300 measures a distance between the stop stem 404 and the diaphragm pin 406. In some examples, the sensor 300 measures the distance at prescribed intervals of time. In some examples, the measurements may be made more frequently if a location of the diaphragm 306 indicates greater gas pressure in the regulator 100. The sensor 300 may be a photo-sensitive transistor, camera, capacitive sensor, mechanical sensor, acoustic sensor, or other technology or design as known to engineers. While the sensor is shown mounted on the stop stem 404, it could alternatively be mounted on the diaphragm pin 406.

In the event that the sensor 300 is mounted on the stop stem 404, the diaphragm pin 406 may be optically reflectorized and/or patterned, magnetic, and/or otherwise treated or configured (e.g., with passive sensor component 402) to reduce the power needed for operation of the sensor 300 and/or to increase the accuracy of the sensor.

In some examples, the sensor 300 is able to measure the force associated with contact between the stop stem 404 and diaphragm pin 406. The force may be translated to a pressure of the gas pushing on the diaphragm, and may indicate an over-pressure event (i.e., a valve lock-up failure), etc.

Measurement of movement and/or location of the diaphragm 306 (such as by measuring the distance between, the stop stem 404 and the diaphragm pin 406) is not dispositive regarding venting of gas from the regulator. However, a signal from a sensor 300 indicating movement of the diaphragm may provide an early-warning signal indicating that remedial/corrective action should be taken to prevent future venting. Also, movement or location of the diaphragm 306 (e.g., as recognized by the sensor 300) over a threshold (or a measured force over a threshold) may strongly imply (or actually be dispositive evidence of) occurrence of a gas-venting.

Referring to FIG. 4, the sensor 300 may be configured with a radio or with wiring to send an output signal. In the example shown, a wire 408 connects the sensor 300 to a device such as the gas meter 102 (seen in FIG. 1) for processing and/or retransmission.

Example Sensor to Detect Relief Valve Movement or Opening

In an example illustrated by FIG. 4, a sensor 400 is mounted in the vent port 204 of the regulator 100. The sensor 400 may alternatively be mounted in a different location within the gas pressure regulator 100 where it is also able to detect movement of the relief valve 318 and/or movement of the relieve valve spring 316. In a manner similar to the sensor 300, the sensor 400 maybe of any desired technology suited to the particular mounting location, power availability, output-signal design requirement(s), space-availability and/or form-factor constraints, etc. Mounting the sensor 400 in the vent port 204 of the regulator allows the sensor to be installed without disassembling the regulator 100. Additionally, if the sensor 400 has a threaded bracket 410 and vent port 204 has internal threads 412, then installing the sensor 400 in the vent port 204 is a matter of rotating the sensor 400 to a position that allows the sensor to best detect movement of the relief valve 318.

In the example, the sensor 400 detects and/or measures movement of the relief valve 318 of the gas regulator 100, and can detect instances of gas-venting. In operation, a signal based on the measurements and/or the detected movement is output from the sensor 400 and transmitted by a device, such as a radio or a wire. In the example shown, wire 414 connects the sensor 400 to a device such as the gas meter 102 (seen in FIG. 1) for processing and/or retransmission.

Example Sensor Installation

In a first example, the sensor 300 may be installed in a gas pressure regulator at the time of manufacture or may be installed as a retrofit in a "used" gas pressure regulator while it is in operation at a customer's site. The stop stem of a gas pressure regulator may be removed and a new stop stem 404 having a sensor 300 may be installed in its place. In some examples, such as when the sensor 300 is an optical sensor, the diaphragm pin 406 may be enhanced (such as by installation of an optically reflective cap or other passive device 402) to aid in uniform and expected light reflection. The installation of the replacement stop stem 404 with sensor 300 may be performed by simply unscrewing an existing stop stem (if present, e.g., a retrofit) and screwing in the replacement stop stem 404 and sensor 300.

In a second example, the relief valve movement detection sensor 400 may be installed in a gas pressure regulator at the time of manufacture or may be installed in a "used" gas pressure regulator while it is in operation at a customer's site. In a manner similar to the installation of the sensor 300, the sensor 400 may be installed in the threaded vent port 204 of the regulator. The sensor 400 and threaded connector 410 may be threaded into the threaded portion 412 of the vent port 204. If the vent port is not threaded, the sensor 400 having an associated bracket may be friction-fit into the vent port.

Example Radio Frequency (RF) Communications System

Figure 5:
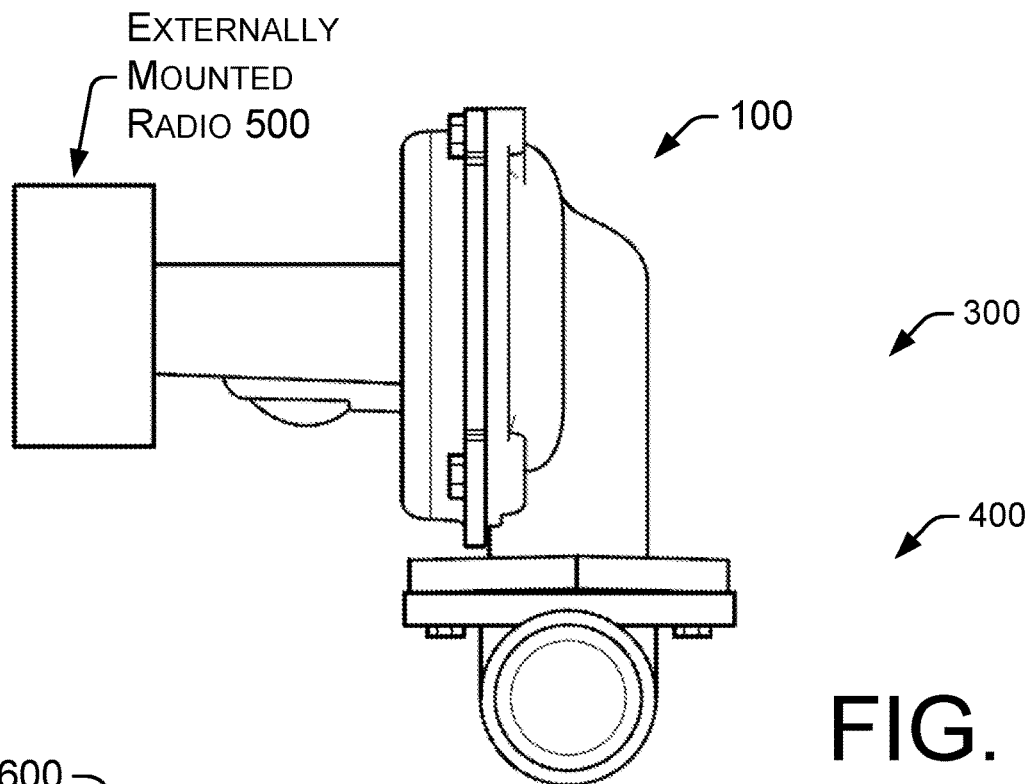
FIG. 5 shows a view of a gas pressure regulator and externally mounted radio frequency (RF) communications device.

FIG. 5 shows a system including a gas pressure regulator 100 and externally mounted radio 500. In the example shown, a radio is configured to receive a signal from the sensor (e.g., sensor 300, sensor 400, or other sensor as indicated by particular design requirements) within the gas pressure regulator. Upon receiving the signal, the radio 500 relays the signal and/or information based at least in part on the signal to a receiver. The receiver may be located at or within a gas meter associated with the gas pressure regulator. In some examples, the radio 500 communicates with a headend device through a mesh and/or cellular network (or other star-configured network), which may, or may not, include the gas meter associated with the gas pressure regulator.

Example Wired Communications System

Figure 6:
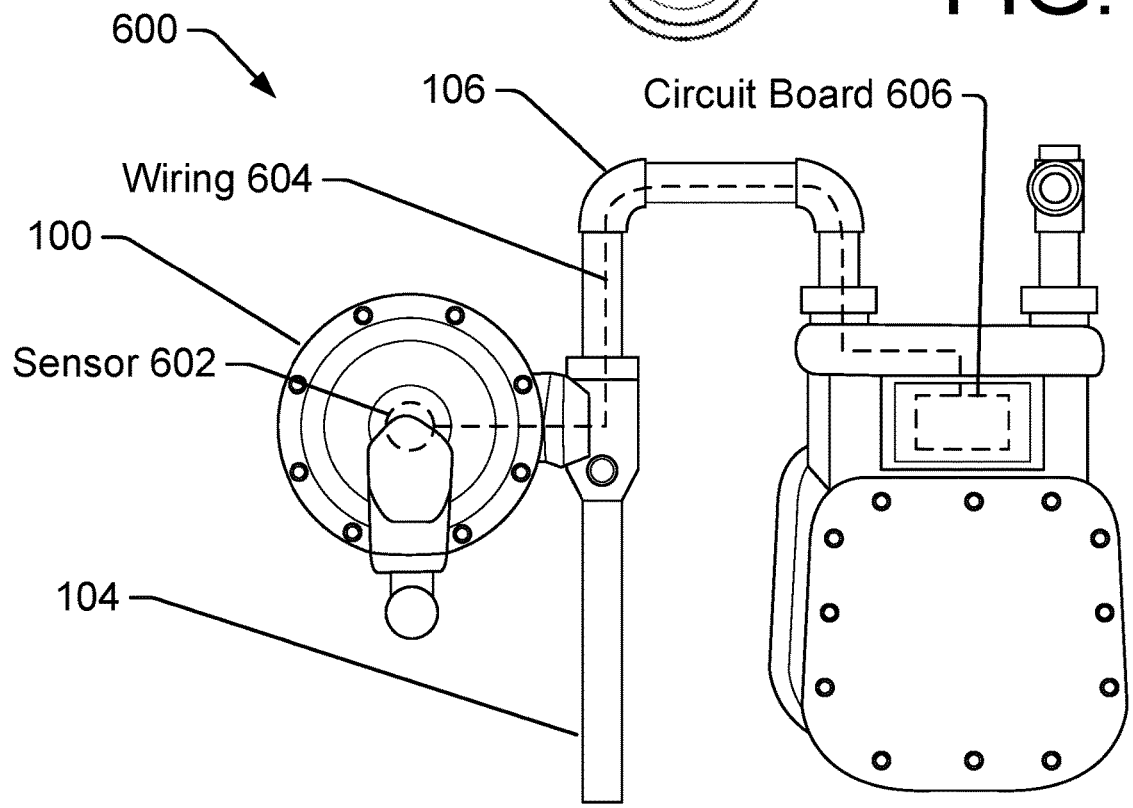
FIG. 6 shows a system including an incoming gas line, a gas pressure regulator, gas meter, and communications wiring between the gas pressure regulator and the gas meter.

FIG. 6 shows a system 600 including an incoming gas line 104, a gas pressure regulator 100, gas meter 102, a pipe 106 from the regulator to the gas meter, and communications wiring between the gas pressure regulator and the gas meter. In the example shown, the sensor 602 (e.g., sensor 300, sensor 400, or other sensor as indicated by particular design requirements) is connected by wiring 604 to circuit board 606 of the gas meter, which may include a processor, memory device(s), a radio, along with firmware, an operating system, software applications, and/or other processing, communications and/or other devices.

Example Methods to Operate a System for Gas Regulator Diaphragm-Position and Pressure-Relief Detection In some examples of the techniques discusses herein, the methods of operation may be performed by one or more application specific integrated circuits (ASIC) or may be performed by a general-purpose processor utilizing software defined in computer readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 7A:
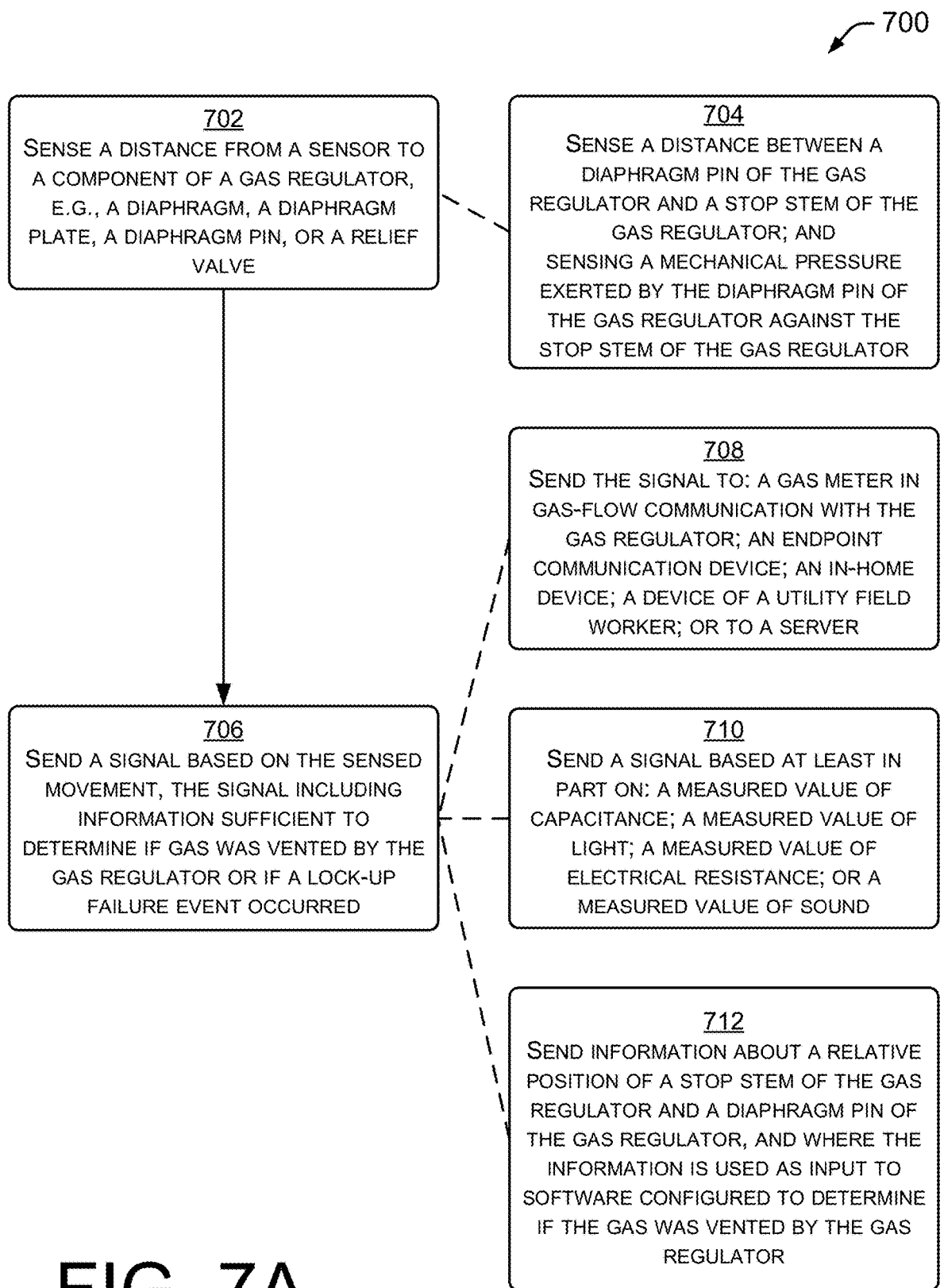

FIG. 7 is a flow diagram showing example operation 700 of a sensor within a gas pressure regulator. In the example, a gas regulator supplies gas at a regulated pressure to a gas meter within a gas distribution system. Without preventive actions, a lock-up failure event and associated venting event may result in gas vented to the atmosphere. To continue the example, a sensor obtains information indicating a relative position components, such as the distance between a stop stem of a gas regulator and a diaphragm pin of the gas regulator, or the position (open or closed) of a component, such as a relief valve. Gas pressure may increase as a result of debris in the gas flow that prevents a valve from fully closing. As pressure increases within the regulator, and the diaphragm is moved, the diaphragm pin moves toward and/or touches the stop stem. Information obtained by the sensor may be contained in a signal sent from the regulator. The signal may be sent from the regulator to an associated gas meter for processing and/or for relay to a data collector and/or headend device for processing. The signal may indicate a lock-up failure event, over-pressure event, and/or a venting event by the gas regulator. The signal may cause preventive actions that result in less gas venting occurrences.

At block 702, a distance from a sensor to at least one component within a gas pressure regulator is sensed. In several examples, the component may include at least one of a diaphragm, a diaphragm plate, a diaphragm pin, a stop stem or a relief valve of the gas regulator. The movement and distance between these components are based at least in part on gas pressure within the gas regulator. At block 704, examples of the distance measured by the sensor, between the sensor and a component of the gas pressure regulator may include one or more of: sensing/measuring a distance between a diaphragm pin of the gas regulator and a stop stem of the gas regulator; and sensing/measuring a mechanical pressure exerted by the diaphragm pin of the gas regulator against the stop stem of the gas regulator.

At block 706, a signal is sent based on the sensed distance. In an example, a signal may include information sufficient to determine if, or that, gas was vented by the gas regulator and/or if, or that, a lock-up failure event or over-pressure event occurred. In another example, the signal may also include an indication that venting did not take place, but that the diaphragm moved more than a threshold value, thereby indicating that venting may be likely in the future.

In the example of block 708, example destinations to which the signal may be sent include: a gas meter in gas-flow communication with the gas regulator; an endpoint communication device; an in-home device; a cellular telephone; a device of a utility company field worker; and/or a server, data collector and/or headend device.

In the example of block 710, a limited listing of sensor types, technologies and operations includes, but is not limited to, a measured value of capacitance; a measured value of light intensity, frequency, and/or reflectance, etc.; a measured value of electrical resistance, voltage, etc.; a measured value of sound intensity, frequency, and/or reflectance, etc.; a measurement based at least in part on magnetism; or any other condition or physical phenomenon associated with any known sensor.

In the example of block 712, the information sent may include information about a relative position of a stop stem of the gas regulator and a diaphragm pin of the gas regulator, and where the information is used as input to software and/or algorithms configured to determine if the gas was vented by the gas regulator.

At block 714, aspects of the operation of the gas pressure regulator are determined and performed. In the example of block 716, a processor may determine, based at least in part on the signal, if a relief valve of the gas regulator vented gas. The process by which the determination is may be performed by a processor of at least one of: the gas regulator; a gas meter receiving gas from the gas regulator; or a computing device at a location remote from the gas regulator and gas meter.

In the example of block 718, the determination of whether the relief valve of the gas regulator vented gas may be made based at least in part on information including at least one of the following: a distance between a stop stem of the gas regulator and a diaphragm pin of the gas regulator; an indicator of contact between the stop stem of the gas regulator and the diaphragm pin of the gas regulator; an indication of movement of the relief valve, such as by operation of sensor 400 of FIG. 4; or an indicator of force between the stop stem of the gas regulator and the diaphragm pin of the gas regulator.

In the example of block 720, a time at which a relief valve of the regulator vented gas may be determined and/or an elapsed time during which gas was vented by the gas regulator may be determined. Such example implementations may be possible if there is sufficient power available to the sensor(s) and/or processors.

In the example of block 722, information may be obtained about a relative position of the stop stem of the gas regulator and the diaphragm pin of the gas regulator. In a first example, a distance may be determined between the stop stem and the diaphragm pin at times when the stop stem and the diaphragm pin are not in contact. In a second example, a mechanical pressure applied to the stop stem by the diaphragm pin may be determined at times when the stop stem and the diaphragm pin are in contact.

In the example of block 724, a relative position of a stop stem of the gas regulator and a diaphragm pin of the gas regulator may be determined. The relative position may be used to determine an event comprising: a gas-venting, i.e., relief event; or a lock-up failure event.

In the example of block 726, a sensor unit may be installed in the gas regulator while gas is allowed to flow through a gas meter in gas-flow communication with the gas regulator. Once installed, the information of the signal may be obtained from the sensor unit. In a first example, the sensor 300 may be installed by replacing the stop stem 402 with a stop stem having a sensor installed as part of the stop stem. In a second example, the sensor 400 may be threaded into the vent port 204 of the gas pressure regulator. The sensor 400 may be oriented to sense movement of the relief valve 318.

Example Systems and Devices

In an overview example, gas pressure regulators regulate pressure to a downstream service point. Within the gas regulator, a mechanical diaphragm moves in and out as pressure within the regulator decreases and increases, respectively. The diaphragm movement may cause pressure against an adjusted stop stem which in turn causes a relief valve to open if the pressure gets too high (e.g., higher than a threshold required to move the relief valve spring). The opening of the relief valve releases some gas into the atmosphere to reduce pressure within the gas pressure regulator. Utility companies are interested in how often gas pressure regulators at their service points are venting gas (sometimes called "burping" within the industry), at least because: venting can indicate possible regulator malfunction; there are concerns with excessive natural gas emissions into the atmosphere; and gas venting can indicate excessive contaminates in the gas supply.

In an example solution, one or more sensor can be placed on the end of the diaphragm stop stem to detect: the distance the diaphragm is away from the stop stem (e.g. using a capacitance sensor); and/or the amount of mechanical pressure that is being exerted by the diaphragm's pin on the stop stem. In examples, distance data can be used to analyze how the regulator is regulating over time and if it is approaching a relief event. The amount of mechanical pressure that is exerted on the stop stem can be used to know that relief occurred and for how long. Analysis of data could occur either in the endpoint or in headend analytics software. In examples, the distance and/or mechanical pressure data can be recorded by either (a) an endpoint directly connected to the sensors in the stop stem or (b) an endpoint connected to a nearby gas meter and cabled to the sensors in the stop stem. In example installation, the stop stem may be part of a mechanical plug that is screwed into the diaphragm. Accordingly, retrofitting the sensor(s) (and any appropriate hardware) on existing regulators may be performed using information supplied herein, and can be done without shutting off gas supply to the service point.

Example sensor units, gas regulators, and methods of operating such devices, include but are not limited to the below examples and numbered clauses.

1. A method, comprising: sensing a distance from a sensor to a component of a gas regulator; sending a signal based on the sensed distance, wherein the signal comprises information sufficient to determine if gas was vented by the gas regulator or if a lock-up failure event occurred.

2. The method of clause 1, wherein the component comprises at least one of a diaphragm, a diaphragm plate, a diaphragm pin, or a relief valve of the gas regulator.

3. The method of clause 1 or any previous clause, wherein sensing distance comprises at one or more of: sensing a distance between a diaphragm pin of the gas regulator and a stop stem of the gas regulator; and sensing a mechanical pressure exerted by the diaphragm pin of the gas regulator against the stop stem of the gas regulator.

4. The method of clause 1 or any previous clause, wherein sending the signal comprises: sending the signal to a gas meter in gas-flow communication with the gas regulator; sending the signal to an endpoint communication device; sending the signal to an in-home device; sending the signal to a device of a utility field worker; or sending the signal to a server.

5. The method of clause 1 or any previous clause, wherein the signal is based at least in part on: a measured value of capacitance; a measured value of light; a measured value of electrical resistance; or a measured value of sound.

6. The method of clause 1 or any previous clause, wherein the information comprises information about a relative position of a stop stem of the gas regulator and a diaphragm pin of the gas regulator, and where the information is used as input to software configured to determine if the gas was vented by the gas regulator.

7. The method of clause 1 or any previous clause, additionally comprising: determining, based at least in part on the signal, if a relief valve of the gas regulator vented gas, wherein the determining is performed by a processor of at least one of: the gas regulator; a gas meter receiving gas from the gas regulator; or a computing device at a location remote from the gas regulator and gas meter.

8. The method of clause 1 or any previous clause, additionally comprising: determining, based at least in part on the signal, if a relief valve of the gas regulator vented gas, wherein the information comprises at least one of: a distance between a stop stem of the gas regulator and a diaphragm pin of the gas regulator; an indicator of contact between the stop stem of the gas regulator and the diaphragm pin of the gas regulator; or an indicator of force between the stop stem of the gas regulator and the diaphragm pin of the gas regulator.

9. The method of clause 1 or any previous clause, additionally comprising: determining a time at which a relief valve of the regulator vented gas; or determining an elapsed time during which gas was vented by the gas regulator.

10. The method of clause 1 or any previous clause, additionally comprising obtaining information about a relative position of a stop stem of the gas regulator and a diaphragm pin of the gas regulator, wherein the information comprises: a distance between the stop stem and the diaphragm pin at times when the stop stem and the diaphragm pin are not in contact; and a mechanical pressure applied to the stop stem by the diaphragm pin at times when the stop stem and the diaphragm pin are in contact.

11. The method of clause 1 or any previous clause, additionally comprising: determining a relative position of a stop stem of the gas regulator and a diaphragm pin of the gas regulator; and using the relative position to determine an event comprising: a relief event; or a lock-up failure event.

12. The method of clause 1 or any previous clause, additionally comprising: installing a sensor unit in the gas regulator while gas is allowed to flow through a gas meter in gas-flow communication with the gas regulator; and obtaining the information from the sensor unit.

13. A sensor unit for installation in a gas regulator, the sensor unit comprising: at least one sensor component configured to measure distance between the at least one sensor component and at least one of a stop stem, a diaphragm pin, a diaphragm plate, a diaphragm, or a relief valve of the gas regulator; and a communication device communicatively coupled to the at least one sensor component to send a wired or wireless signal to a processor, wherein the signal is based on information from the at least one sensor component.

14. The sensor unit as recited in clause 13, wherein the signal conveys information sufficient to determine if the gas regulator vents gas or fails to lock-up.

15. The sensor unit as recited in clause 13 or any previous clause, wherein the at least one sensor component comprises: a sensor to sense a distance between two or more components of the gas regulator; and a sensor to determine a mechanical pressure exerted by the diaphragm pin on the stop stem.

16. The sensor unit as recited in clause 13 or any previous clause, wherein the sensor is calibrated to indicate when pressure in the gas regulator exceeds a pressure at which a relief valve of the gas regulator is configured to vent gas from the gas regulator.

17. The sensor unit as recited in clause 13 or any previous clause, wherein the sensor comprises at least one of: a capacitance sensor; a light sensor; a magnetic sensor; a pressure sensor; or a camera.

18. The sensor unit as recited in clause 13 or any previous clause, additionally comprising: a wired connection to attach the sensor unit to a processor of a device in gas-flow communication with the gas regulator, wherein the device comprises one or more of: an endpoint communication device; an in-home device; a utility field worker; or a server.

19. A gas regulator, comprising: a diaphragm; a diaphragm pin configured to move according to movement of the diaphragm; a stop stem in a path of movement of the diaphragm pin; a relief valve to vent gas based at least in part gas pressure within the gas regulator; at least one sensor component configured to measure a distance between a sensor and the stop stem or the diaphragm pin; and a communication device communicatively coupled to the at least one sensor component to send a signal to a processor, wherein the signal is based on information of a relief or lock-up failure event.

20. A system, comprising the gas regulator as recited in clause 19, and additionally comprising: a gas meter to receive gas flow from the gas regulator.

Example Gas Regulator Monitor

The example sensor units and methods discussed above for regulator operation describe techniques for the generation of data within a gas distribution system related to one or more over-pressure events, valve-closing failure events, lock-up failure events, and/or venting events, wherein gas is vented to the atmosphere. The data may identify the identity of gas pressure regulators and associated gas metering devices at which the lock-up failure events or gas-venting events occurred. Based at least in part on the identified gas regulators, associated gas meters and service sites, a number of gas regulators having at least one of valve lock-up failure (i.e., valve closure failure) events or venting events that are connected to a same gas supply line may be identified. If the number of gas regulators having at least one of lock-up failure events or venting events on the identified gas supply line exceeds a threshold number this may indicate the presence of debris in the gas supply. In some examples, the threshold number may be based at least in part on the number of service sites connected to the gas supply line (e.g., a higher threshold value if a larger number of service sites are connect to the supply line). Remedial steps may be taken, and the situation may be monitored and reassessed.

Figure 8:
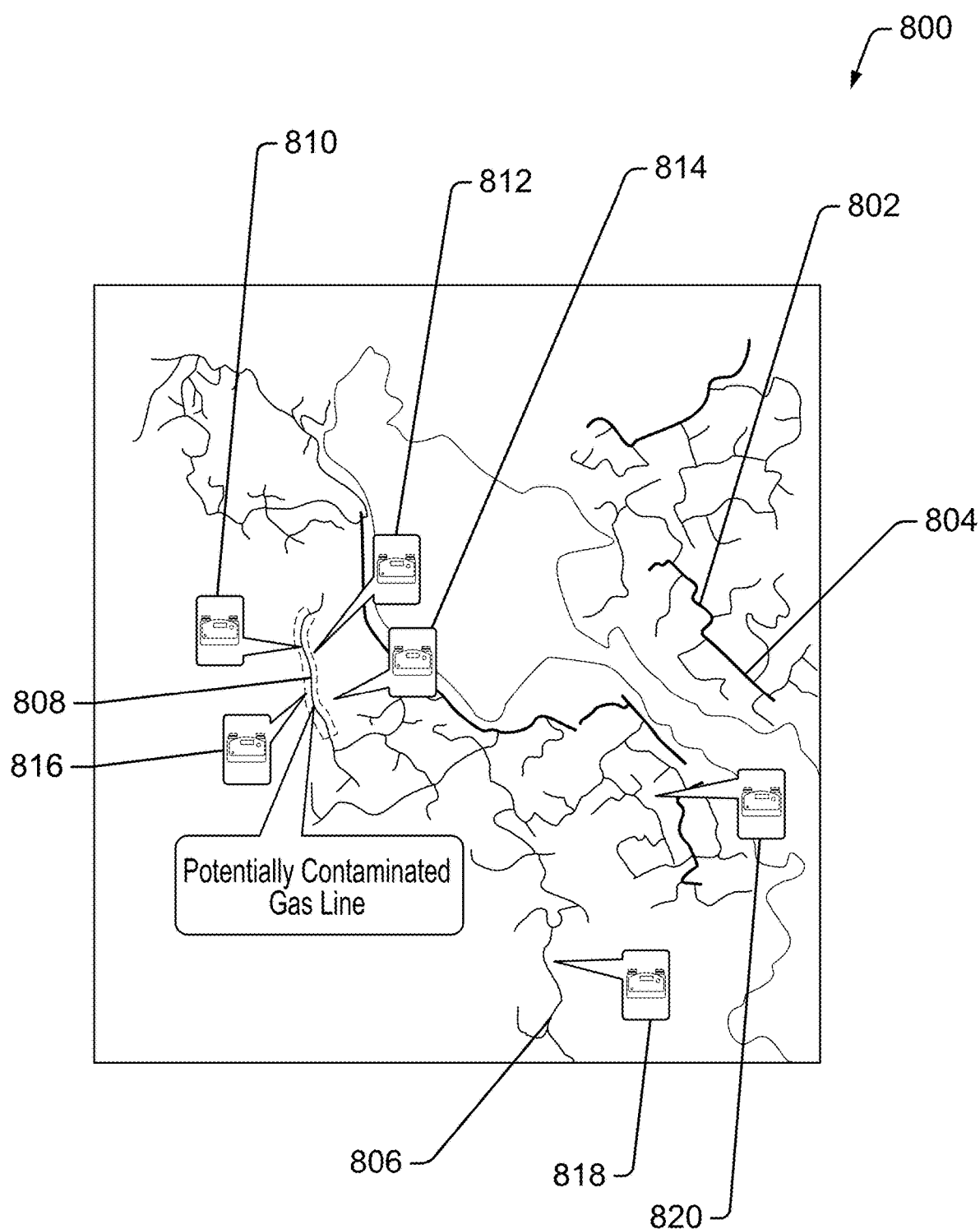
FIG. 8 is a map of a region within an example gas delivery and/or distribution system.

FIG. 8 shows a region 800 within a gas delivery and/or distribution system. In an example, the gas delivery system within the region 800 is served by a utility company. Within the region 800, a plurality of main gas distribution lines 802-808 are shown as an arbitrary representation of a larger number of main gas distribution lines. The main gas lines provide gas to a number of service sites (i.e., customers), each configured with a smart gas pressure regulator (e.g., the regulators shown in FIGS. 3 and 4).

In the region 800, a number of smart gas pressure regulators 810-820 have reported over-pressure events, gas venting events, and/or lockup-failures. The reported events may have been made in a period of time having less than a threshold length. Such a threshold period tends to increase a likelihood that the reported events are related. In one example, the reporting may be made at least in part responsive to execution of some or all of the techniques described in FIGS. 7A-C and/or by smart gas pressure regulators that are the same as, or similar to, those described in FIGS. 3 and/or 4. The reporting may be made to an algorithm (e.g., by means of an application programming interface or API) to determine if the cause of events from among the reported events is related.

After the reported over-pressure events, gas venting events, and/or lockup-failures, the algorithm may be used to determine if multiple reported events correlate to a common gas line or to a common distribution region. Responsive to finding that one or both correlations are found, the findings may be reported to appropriate personnel within the utility company to remediate the cause(s) of the over-pressure events.

In the example shown, the algorithm determines that the over-pressure events located at service sites associated with gas pressure regulators 810-816 are all associated with main gas 400 distribution line 808. The over-pressure events of gas pressure regulators 818, 820 are not associated with main gas distribution line 808. Moreover, the over-pressure events of gas pressure regulators 818, 820 do not themselves have a common association with any main gas distribution line. Accordingly, the over-pressure events of gas pressure regulators 818, 820 may each be considered to be "one off" events, unrelated to a common gas main or area of the region 800. In contrast, the over-pressure events at service sites 810-816 are related to a common main gas line 808.

In an example, the algorithm the reported over-pressure events may be configured using a database or other information structure that includes relationships of the devices that make up the gas delivery and/or distribution system. In an example, a topology of the system is used to determine if there is a relationship between the gas pressure regulators reporting over-pressure events. In an example, by accessing a database having topological information, it may be determined if service sites are related by commonly used gas mains and/or similar geographic location.

Figure 9:
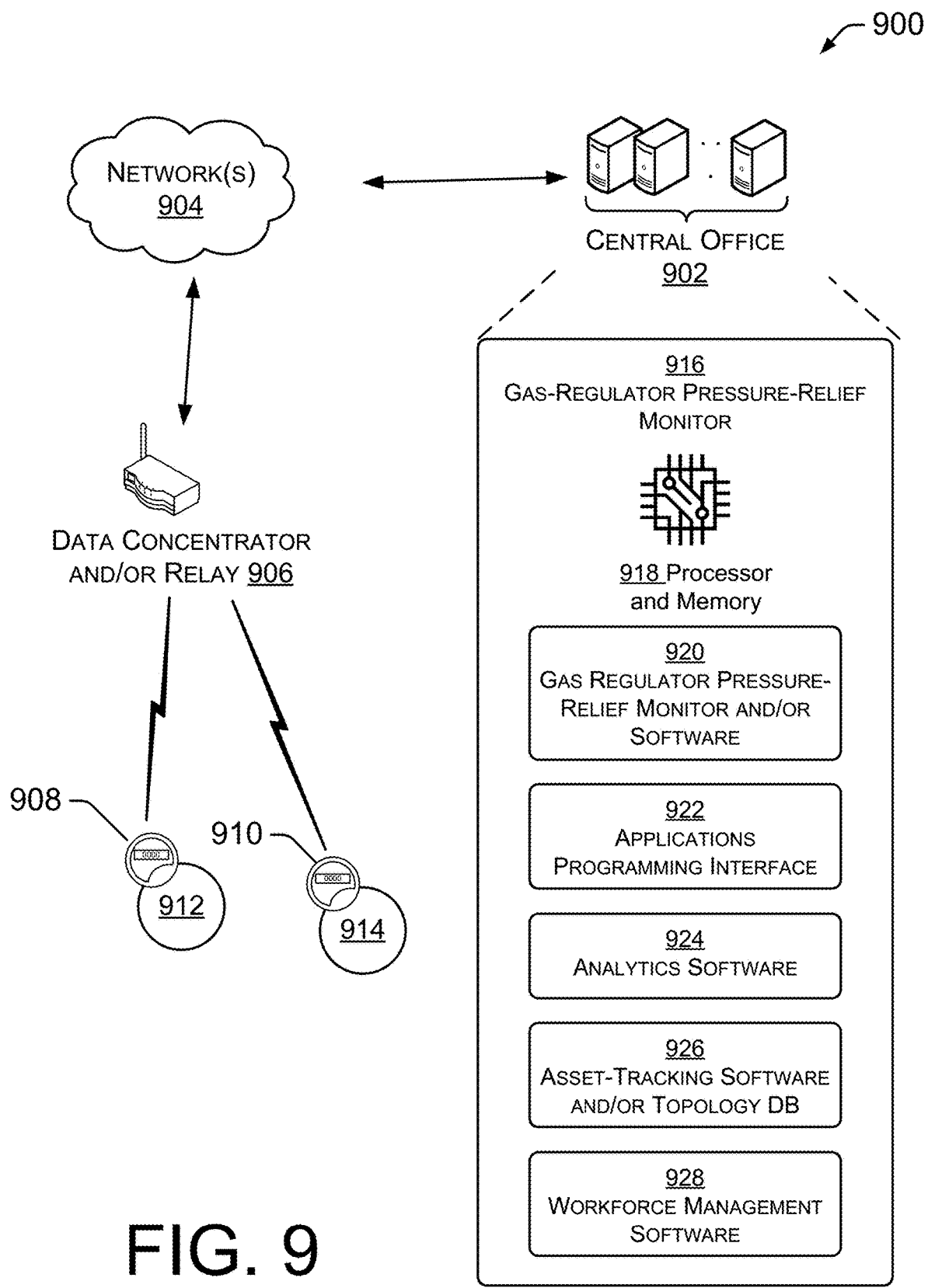
FIG. 9 is a diagram showing example aspects of a gas pressure relief monitor.

FIG. 9 shows aspects of an example gas pressure relief system or monitor 900. A central office 902 or server communicates over one or more networks 904 (e.g., possibly including the internet) with a data concentrator and/or relay 906 or alternative network device. The concentrator 906 communicates with a plurality of gas meters 908, 910, which may be associated with respective smart gas pressure regulators 912, 914 (e.g., the smart gas pressure regulators of FIGS. 3 and/or 4). The concentrator 906 may communicate with the smart gas pressure regulators 912, 914 (in some examples with the assistance of their respective smart gas pressure meters 908, 910) over a star, mesh and/or cellular network. In some example installations, the data concentrator 906 may not be required if the smart gas pressure regulators devices are in communication with local cellular towers.

The central office computing device 902 may be configured with a gas-regulator pressure-relief monitor 916. In one example, the monitor 916 may receive inputs from a plurality of smart gas pressure regulators 912, 914 and process that incoming data. Data from the regulators 912, 914 may be relayed by respective smart gas meters 908, 910. In response, the monitor 916 may provide data regarding the performance of a gas supply system to human operators. In an example, the data provided by the monitor 916 would indicate gas supply system over-pressure events, gas regulator valve-lockup failure events and/or gas venting (gas pressure relief) events. In a further example, the monitor 916 may provide manual and/or automatic means to correct and/or mitigate the over-pressure and gas-venting events (e.g., events caused by a lockup-failure of gas pressure regulators).

Processor and memory devices 918 may be configured to operate the gas regulator pressure-relief monitor and/or software 920. In an example, the monitor 916 is configured at least in part as software, and processes input from a plurality of smart gas pressure regulators, including data related to over-pressure, venting and valve lockup failures. The monitor 916 may communicate with one or more software applications, which may be located on the central office server 902. In an example, an applications programming interface (API) 922 is used.

The monitor 916 may communicate with analytics software 924, asset tracking software and/or a topology database 926, and/or workforce management software 928. In some examples, the software 924, 926, 928 may be part of the monitor 916; however, in other examples the software 924, 926, 928 may be remote from the monitor 916.

In an example, analytics software 924 may be configured to process input from smart gas pressure regulators and provide analytics information to an operator. In an example, asset-tracking and/or a gas delivery system topology database 926 allows the monitor to determine a relationship between gas meters and gas pressure regulators and their respective gas-supply mains. Accordingly, the database 926 allows the monitor to determine if the cause of one gas pressure regulator's over-pressure and/or gas-venting event is possibly the same cause of another gas pressure regulator's event. In an example, workforce management software 928 may be used (e.g., through the API 922) to send work crews to particular areas to appropriate locations to perform appropriate tasks to mitigate causes of over-pressure, lockup-failure, and/or gas-venting events.

Example Methods to Operate a Gas Regulator Pressure-Relief Monitor

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 10A:
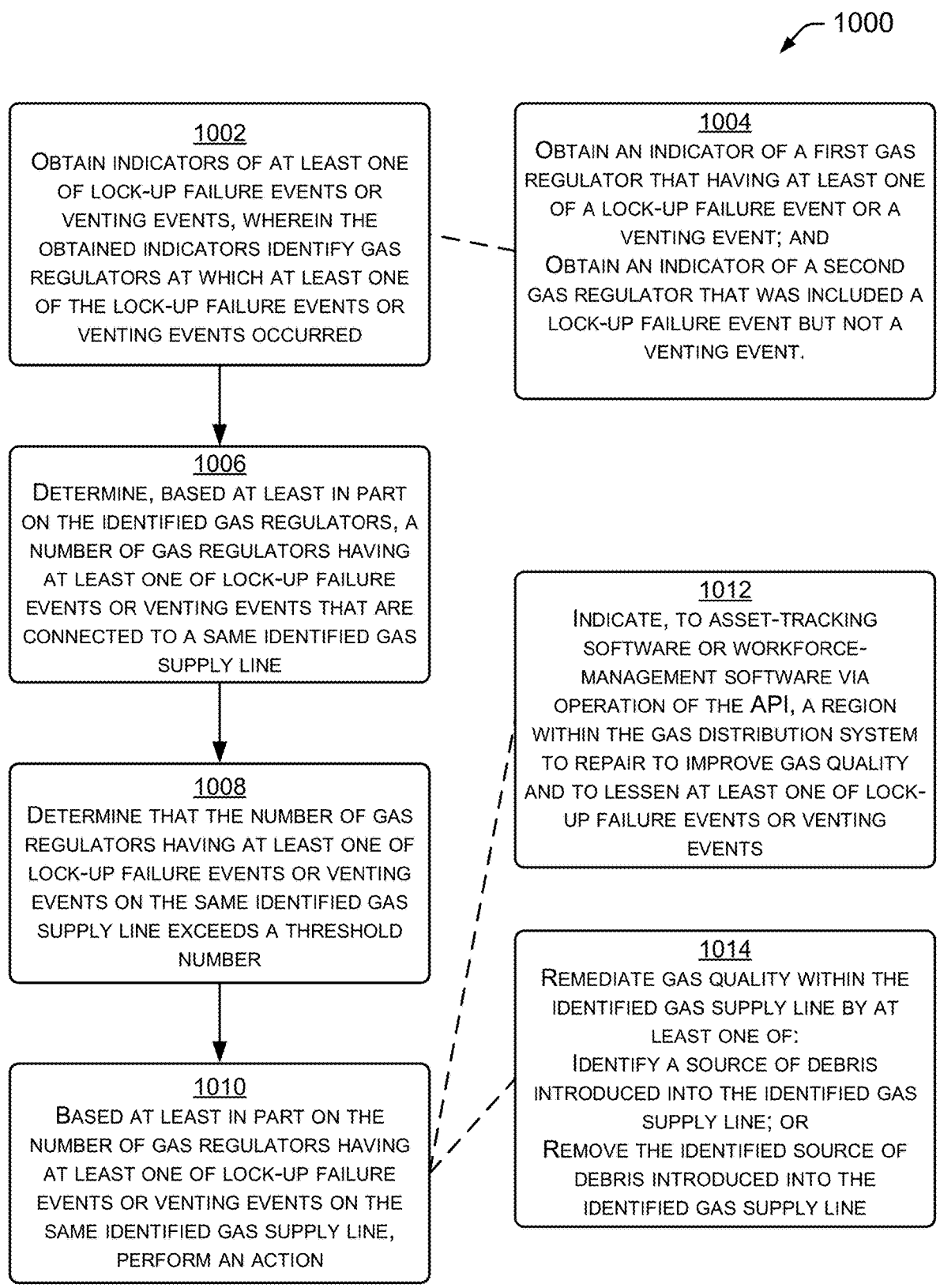
FIGS. 10A and 10B are respective parts of a flow diagram showing example operation of a gas pressure relief monitor.
Figure 10B:
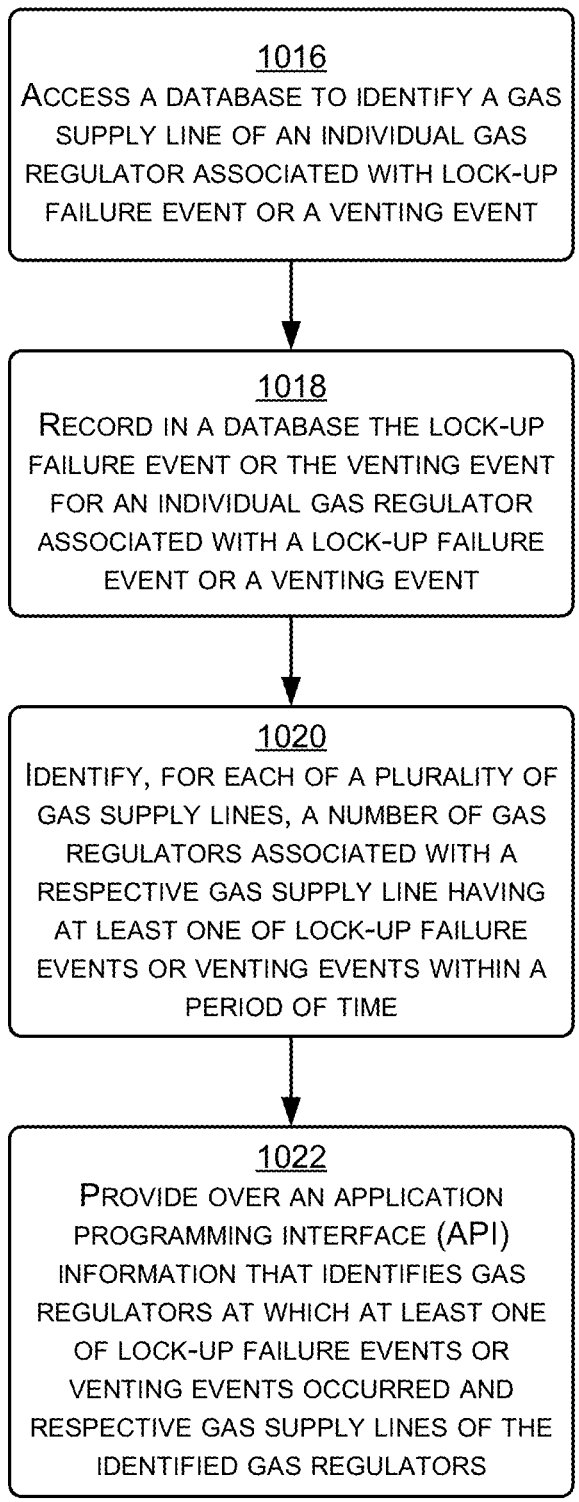

FIGS. 10A and 10B are respective parts a flow diagram showing example operation 1000 of a gas pressure relief monitor.

At block 1002, indicators of at least one of lock-up failure events or venting events are obtained. In an example, wherein the obtained indicators identify gas regulators at which at least one of the lock-up failure events or venting events occurred. In the further examples of block 1004, an indicator of a first gas regulator that having at least one of a lock-up failure event or a venting event is obtained and an indicator of a second gas regulator that included a lock-up failure event but not a venting event is obtained.

At block 1006, based at least in part on the identified gas regulators, a number of gas regulators having at least one of lock-up failure events or venting events that are connected to a same identified gas supply line is determined. A larger number of events may indicate that debris is contaminating a particular gas main. If a particular gas main is indicated, then it can be investigated (e.g., by action of workforce management software 928 or other means).

At block 1008, it is determined that the number of gas regulators having at least one of lock-up failure events or venting events on the same identified gas supply line exceeds a threshold number. In the example of block 1010, based at least in part on the number of gas regulators having at least one of lock-up failure events or venting events on the same identified gas supply line, an action is performed. In a first example action, at block 1012 an indication is sent (e.g., to asset-tracking software or workforce-management software) that identifies a region within the gas distribution system to repair to improve gas quality and to lessen at least one of lock-up failure events or venting events. The indication may be sent via operation of the API. In a second example action, at block 1014 gas quality may be remediated within the identified gas supply line by at least one of: identifying a source of debris introduced into the identified gas supply line; and/or removing the identified source of debris introduced into the identified gas supply line.

At block 1016, a database may be accessed to identify a gas supply line of an individual gas regulator associated with lock-up failure event or a venting event.

At block 1018, the lock-up failure event or the venting event for an individual gas regulator associated with a lock-up failure event or a venting event may be recorded in a database.

At block 1020, for each of a plurality of gas supply lines, a number of gas regulators associated with a respective gas supply line having at least one of lock-up failure events or venting events within a period of time At block 1022, information may be provided over an application programming interface (API), which identifies gas regulators at which at least one of lock-up failure events or venting events occurred and respective gas supply lines of the identified gas regulators.

Example Systems and Devices

A gas pressure regulator may have instances of pressure-relief, wherein gas is vented to the atmosphere. A system operates to monitor such instances, and to utilize the information in a manner that reduces such instances.

When a gas regulator goes over-pressure, it vents natural gas to the atmosphere. This is undesirable as natural gas is a greenhouse gas, an economic asset, and a flammable hazard. Regulators may go over-pressure when small pieces of debris are caught in the valve mechanism that shuts off the gas flow through the gas pressure regulator. With the debris in the valve, the regulator will not fully shut off. If there is contamination in a pipeline distributing gas to a neighborhood, then regulators downstream of the contamination will be susceptible to going over-pressure. In an example, it is valuable to alert a utility company to the over-pressure events in gas pressure regulators so they can address the issue and prevent additional natural gas venting.

The techniques discussed herein leverage the techniques discussed above. In particular, the above-discussed advancements in regulator technology make possible the manufacture of smart gas-pressure regulators and the retro-fit modification of existing regulators. Accordingly, a utility company can know if a regulator goes over-pressure. The techniques discussed herein take the reporting of over-pressure events and overlays the location of the occurrences with the gas distribution system over an adjustable time range. In an example, an algorithm evaluates if the multiple occurrences correlate to a common gas line or a common distribution region. Output of the algorithm may indicate the need to notify the utility company of a problem in the area. (The notification may be inherent, if the techniques and algorithm are operated on computing devices of the company.) Individual, isolated occurrences of over-pressure events are recorded but no action is recommended unless/until multiple over-pressure situations have occurred in a particular area and/or are associated with a particular gas main.

In an example, data on the utility distribution system pipe-runs, gate valves, and service points can be obtained through interfaces to existing utility asset tracking software. In additional examples, the techniques could be presented as an API interface that feeds data into the utility company's existing asset tracking software. Once notified, the utility company can follow-up manually to inspect the system in relevant area(s) for debris introduced by near-by construction, corroding pipes, and/or other causes. In other example implementations, the techniques described herein can be linked to workforce management software to automatically schedule inspections when problem areas are identified.

Example gas regulator pressure relief systems and/or monitors of a gas distribution system, computer readable media, and methods of operation, include but are not limited to the below examples and numbered clauses.

1. A method, comprising: obtaining indicators of at least one of lock-up failure events or venting events, wherein the obtained indicators identify gas regulators at which at least one of the lock-up failure events or venting events occurred; determining, based at least in part on the identified gas regulators, a number of gas regulators having at least one of lock-up failure events or venting events that are connected to a same identified gas supply line; determining that the number of gas regulators having at least one of lock-up failure events or venting events on the same identified gas supply line exceeds a threshold number; and based at least in part on the number of gas regulators having at least one of lock-up failure events or venting events on the same identified gas supply line, performing an action.

2. The method of clause 1, wherein the action comprises remediating gas quality within the identified gas supply line by at least one of: identifying a source of debris introduced into the identified gas supply line; or removing the identified source of debris introduced into the identified gas supply line.

3. The method of clause 1 or any previous clause, wherein obtaining the indicators of at least one of lock-up failure events or venting events comprises: obtaining an indicator of a first gas regulator that having at least one of a lock-up failure event or a venting event; and obtaining an indicator of a second gas regulator that was included a lock-up failure event but not a venting event.

4. The method of clause 1 or any previous clause, additionally comprising: accessing a database to identify a gas supply line of an individual gas regulator associated with lock-up failure event or a venting event.

5. The method of clause 1 or any previous clause, additionally comprising: recording in a database the lock-up failure event or the venting event for an individual gas regulator associated with a lock-up failure event or a venting event.

6. The method of clause 1 or any previous clause, additionally comprising: identifying, for each of a plurality of gas supply lines, a number of gas regulators associated with a respective gas supply line having at least one of lock-up failure events or venting events within a period of time.

7. The method of clause 1 or any previous clause, additionally comprising: providing over an application programming interface (API) information that identifies gas regulators at which at least one of lock-up failure events or venting events occurred and respective gas supply lines of the identified gas regulators.

8. One or more computer-readable media storing computer-executable instructions that, when executed by one or more processors, configure a computing device to perform acts comprising: obtaining indicators of at least one of lock-up failure events or venting events, wherein the obtained indicators identify gas regulators at which the lock-up failure events or venting events occurred; determining, based at least in part on the identified gas regulators, a number of gas regulators having at least one of lock-up failure events or venting events that are connected to a same identified gas supply line; determining that the number of gas regulators having at least one of lock-up failure events or venting events on the same identified gas supply line exceeds a threshold number; and based at least in part on the number of gas regulators having at least one of lock-up failure events or venting events on the same identified gas supply line, performing an action.

9. The one or more computer-readable media as recited in clause 8, wherein the acts additionally comprise: sending instructions to prevent entry of debris into the same identified gas supply line; and confirming, after action on the instructions, that gas regulators supplied by the identified gas supply line are experiencing less than a threshold number of lock-up failure events or venting events per unit time.

10. The one or more computer-readable media as recited in clause 8 or any previous clause, wherein obtaining indicators comprises: obtaining an indicator of a first gas regulator having a lock-up failure event or a venting event; and obtaining an indicator of a second gas regulator having a lock-up failure event but not a venting event.

11. The one or more computer-readable media as recited in clause 8 or any previous clause, wherein the acts additionally comprise: accessing a database to identify the identified gas supply line of a gas regulator associated with a lock-up failure event or a venting event.

12. The one or more computer-readable media as recited in clause 8 or any previous clause, additionally comprising, for an individual gas regulator associated with a lock-up failure event or a venting event, acts comprising: recording in a database the lock-up failure event or the venting event for the individual gas regulator.

13. The one or more computer-readable media as recited in clause 8 or any previous clause, wherein the acts additionally comprise: identifying, for each of a plurality of gas supply lines, a number of gas regulators associated with a respective gas supply line having at least one of lock-up failure events or venting events within a period of time.

14. The one or more computer-readable media as recited in clause 8 or any previous clause, wherein the acts additionally comprise: sending a request to remove one or more sources of contaminate particles introduced into the identified gas supply line.

15. The one or more computer-readable media as recited in clause 8 or any previous clause, wherein the acts additionally comprise: providing via an application programming interface (API) information that identifies gas regulators at which occurred and respective gas supply lines of the identified gas regulators.

16. A gas regulator pressure relief monitor of a gas distribution system, comprising: an application programming interface (API), wherein the API is available to asset-tracking software or workforce-management software to schedule maintenance; a sensor of a gas regulator to detect at least one of lock-up failure events or venting events within each of a plurality of gas regulators of a respective plurality of gas meters within the gas distribution system; a communications network of the gas distribution system; a processor configured to perform actions, comprising: obtaining data indicating at least one of lock-up failure events or venting events via the communications network, wherein the obtained data were based on information obtained by sensors of gas regulators from among the plurality of gas regulators, and wherein the obtained data identify gas regulators at which at least one of lock-up failure events or venting events occurred; determining, based at least in part on the identified gas regulators, a number of gas regulators having at least one of lock-up failure events or venting events that are connected to a same gas supply line; determining if the number of gas regulators having at least one of lock-up failure events or venting events on the same gas supply line exceeds a threshold number; and indicating, to asset-tracking software or workforce-management software via operation of the API, a region within the gas distribution system to repair to improve gas quality and to lessen at least one of lock-up failure events or venting events.

17. The gas regulator pressure relief monitor of clause 16, wherein the region indicated is determined based at least in part by actions comprising: identifying a location along the same gas supply line having more downstream at least one of lock-up failure events or venting events and fewer upstream at least one of lock-up failure events or venting events.

18. The gas regulator pressure relief monitor of clause 16 or any previous clause, wherein the actions additionally comprise: sending a message requesting that gas quality be remediated within the same gas supply line, wherein the remediating comprises one or more of: identifying a source of debris introduced into the same gas supply line; and removing the identified source of debris introduced into the same gas supply line.

19. The gas regulator pressure relief monitor of clause 16 or any previous clause, wherein the actions additionally comprise accessing a database to perform actions comprising: recording instances of at least one of lock-up failure events or venting events for each of the plurality of gas regulators; and identifying a gas supply line of a gas regulator associated with a lock-up failure event or a venting event.

20. The gas regulator pressure relief monitor of clause 16 or any previous clause, wherein the actions additionally comprise: obtaining an indicator of a first gas regulator having a lock-up failure and venting gas; and obtaining an indicator of a second gas regulator having a lock-up failure but not venting gas.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
obtaining indicators of at least one of lock-up failure events or venting events, wherein the obtained indicators identify gas regulators at which at least one of the lock-up failure events or venting events occurred;
determining, based at least in part on the identified gas regulators, a number of gas regulators having at least one of lock-up failure events or venting events that are connected to a same identified gas supply line;
determining that the number of gas regulators having at least one of lock-up failure events or venting events on the same identified gas supply line exceeds a threshold number; and
based at least in part on the number of gas regulators having at least one of lock-up failure events or venting events on the same identified gas supply line, performing an action.

2. The method of claim 1, wherein the action comprises remediating gas quality within the identified gas supply line by at least one of:
identifying a source of debris introduced into the identified gas supply line; or
removing the identified source of debris introduced into the identified gas supply line.

3. The method of claim 1, wherein obtaining the indicators of at least one of lock-up failure events or venting events comprises:
obtaining an indicator of a first gas regulator having at least one of a lock-up failure event or a venting event; and obtaining an indicator of a second gas regulator having a lock-up failure event but not a venting event.

4. The method of claim 1, additionally comprising:
accessing a database to identify a gas supply line of an individual gas regulator associated with a lock-up failure event or a venting event.

5. The method of claim 1, additionally comprising:
recording in a database a lock-up failure event or a venting event for an individual gas regulator associated with a lock-up failure event or a venting event.

6. The method of claim 1, additionally comprising:
identifying, for each of a plurality of gas supply lines, a number of gas regulators associated with a respective gas supply line having at least one of lock-up failure events or venting events within a period of time.

7. The method of claim 1, additionally comprising:
providing over an application programming interface (API) information that identifies the identified gas regulators and respective gas supply lines of the identified gas regulators.

8. One or more non-transitory computer-readable media storing computer-executable instructions that, when executed by one or more processors, configure a computing device to perform acts comprising:
obtaining indicators of at least one of lock-up failure events or venting events, wherein the obtained indicators identify gas regulators at which the lock-up failure events or venting events occurred;
determining, based at least in part on the identified gas regulators, a number of gas regulators having at least one of lock-up failure events or venting events that are connected to a same identified gas supply line;
determining that the number of gas regulators having at least one of lock-up failure events or venting events on the same identified gas supply line exceeds a threshold number; and
based at least in part on the number of gas regulators having at least one of lock-up failure events or venting events on the same identified gas supply line, performing an action.

9. The one or more non-transitory computer-readable media as recited in claim 8, wherein the acts additionally comprise:
sending instructions to prevent entry of debris into the same identified gas supply line; and
confirming, after action on the instructions, that gas regulators supplied by the identified gas supply line are experiencing less than a threshold number of lock-up failure events or venting events per unit time.

10. The one or more non-transitory computer-readable media as recited in claim 8, wherein obtaining indicators comprises:
obtaining an indicator of a first gas regulator having a lock-up failure event or a venting event; and
obtaining an indicator of a second gas regulator having a lock-up failure event but not a venting event.

11. The one or more non-transitory computer-readable media as recited in claim 8, wherein the acts additionally comprise:
accessing a database to identify a gas supply line of a gas regulator associated with a lock-up failure event or a venting event.

12. The one or more non-transitory computer-readable media as recited in claim 8, additionally comprising, for an individual gas regulator associated with a lock-up failure event or a venting event, acts comprising:
recording in a database the lock-up failure event or the venting event for the individual gas regulator.

13. The one or more computer-readable non-transitory media as in claim 8, wherein the acts additionally comprise:
identifying, for each of a plurality of gas supply lines, a number of gas regulators associated with a respective gas supply line having at least one of lock-up failure events or venting events within a period of time.

14. The one or more computer-readable non-transitory media as recited in claim 8, wherein the acts additionally comprise:
sending a request to remove one or more sources of contaminate particles introduced into the identified gas supply line.

15. The one or more computer-readable non-transitory media as recited in claim 8, wherein the acts additionally comprise:
providing via an application programming interface (API) information that identifies the identified gas regulators and respective gas supply lines of the identified gas regulators.

16. A gas regulator pressure relief monitor of a gas distribution system, comprising:
an application programming interface (API), wherein the API is available to asset-tracking software or workforce-management software to schedule maintenance;
a sensor in each of a plurality of gas regulators of a respective plurality of gas meters to detect at least one of lock-up failure events or venting events within each of the plurality of gas regulators of the respective plurality of gas meters within the gas distribution system;
a communications network of the gas distribution system; and
a processor configured to perform actions, comprising:
obtaining data indicating at least one of lock-up failure events or venting events via the communications network, wherein the obtained data were based on information obtained by sensors of gas regulators from among the plurality of gas regulators, and wherein the obtained data identify gas regulators at which at least one of lock-up failure events or venting events occurred;
determining, based at least in part on the identified gas regulators, a number of gas regulators having at least one of lock-up failure events or venting events that are connected to a same gas supply line;
determining if the number of gas regulators having at least one of lock-up failure events or venting events on the same gas supply line exceeds a threshold number; and
indicating, to asset-tracking software or workforce-management software via operation of the API, the same gas supply line of the gas distribution system as a region to repair to improve gas quality and to lessen at least one of lock-up failure events or venting events.

17. The gas regulator pressure relief monitor of claim 16, wherein the region indicated is determined based at least in part by actions comprising:
identifying a location along the same gas supply line having more downstream at least one of lock-up failure events or venting events and fewer upstream at least one of lock-up failure events or venting events.

18. The gas regulator pressure relief monitor of claim 16, wherein the actions additionally comprise:
- sending a message requesting that gas quality be remediated within the same gas supply line, wherein the remediating comprises one or more of:
  - identifying a source of debris introduced into the same gas supply line; and
  - removing the identified source of debris introduced into the same gas supply line.

19. The gas regulator pressure relief monitor of claim 16, wherein the actions additionally comprise accessing a database to perform actions comprising:
- recording instances of at least one of lock-up failure events or venting events for each of the plurality of gas regulators; and
- identifying a gas supply line of a gas regulator associated with a lock-up failure event or a venting event.

20. The gas regulator pressure relief monitor of claim 16, wherein the actions additionally comprise:
- obtaining an indicator of a first gas regulator having a lock-up failure and venting gas; and
- obtaining an indicator of a second gas regulator having a lock-up failure but not venting gas.

* * * * *